United States Patent [19]

Suzuki et al.

[11] Patent Number: 4,876,562

[45] Date of Patent: Oct. 24, 1989

[54] IMAGE RECORDING APPARATUS

[75] Inventors: Yasuhito Suzuki, Kawasaki; Koichiro Akimoto, Yokohama; Hajime Ohshima, Tokyo; Kazuyuki Honda; Yukio Isaka, both of Yokohama, all of Japan

[73] Assignee: Canon Kabushiki Kaisha, Tokyo, Japan

[21] Appl. No.: 313,361

[22] Filed: Feb. 21, 1989

Related U.S. Application Data

[63] Continuation of Ser. No. 779,107, Sep. 23, 1985, abandoned.

[30] Foreign Application Priority Data

| | | | |
|---|---|---|---|
| Sep. 25, 1984 | [JP] | Japan | 59-198623 |
| Sep. 25, 1984 | [JP] | Japan | 59-198624 |
| Sep. 25, 1984 | [JP] | Japan | 59-198626 |

[51] Int. Cl.[4] .................. G01D 15/14; G03G 21/00

[52] U.S. Cl. .................. 346/160; 355/202; 355/311; 358/451

[58] Field of Search .............. 355/3 R, 3 SH, 7, 14 R, 355/14 C, 24; 346/153.1, 160; 358/287, 298, 300

[56] References Cited

U.S. PATENT DOCUMENTS

| | | | |
|---|---|---|---|
| 4,099,254 | 7/1978 | Andrews et al. | 355/14 R X |
| 4,162,844 | 7/1979 | Traister et al. | 355/14 R X |
| 4,187,024 | 2/1980 | Satomi et al. | 355/14 R |
| 4,423,439 | 12/1983 | Watanabe | 355/7 X |
| 4,453,841 | 6/1984 | Bobick et al. | 355/3 SH X |
| 4,579,446 | 4/1986 | Fujino et al. | 355/24 |

*Primary Examiner*—Fred L. Braun

*Attorney, Agent, or Firm*—Fitzpatrick, Cella, Harper & Scinto

[57] ABSTRACT

An apparatus for recording an image on a record medium includes an image forming device which operates in a plurality of record modes, and a control device for determining the record mode to be used on the basis of inputted page direction information and inputted print direction information.

39 Claims, 29 Drawing Sheets

| ITEM / NUMBER | PAPER FEED DIRECTION Lengthwize/ Breadthwize | PAGE DIRECTION Portrait/ Landscape | DRINT DIRECTION Vertical/ Horizontal | GYO DIRECTION | MOJI DIRECTION (DIRECTION OF "A") | FIGS 6 AND 7 ARE DIFERENT |
|---|---|---|---|---|---|---|
| 51a | L | P | V | DOWN ↓ | A | |
| 51b | | | H | RIGHT → | A | |
| 51c | | L | V | RIGHT → | A (turned left) | |
| 51d | | | H | UP ↑ | A (turned left) | O |
| 51e | B | P | V | RIGHT → | A (turned left) | |
| 51f | | | H | UP ↑ | A (turned left) | O |
| 51g | | L | V | DOWN ↓ | A | |
| 51h | | | H | RIGHT → | A | |
| 52a | L | P | V | DOWN ↓ | A | |
| 52b | | | H | RIGHT → | A | |
| 52c | | L | V | RIGHT → | A (turned left) | |
| 52d | | | H | DOWN ↓ | A (turned right) | O |
| 52e | B | P | V | RIGHT → | A (turned left) | |
| 52f | | | H | DOWN ↓ | A (turned right) | O |
| 52g | | L | V | DOWN ↓ | A | |
| 52h | | | H | RIGHT → | A | |

FIG. 10

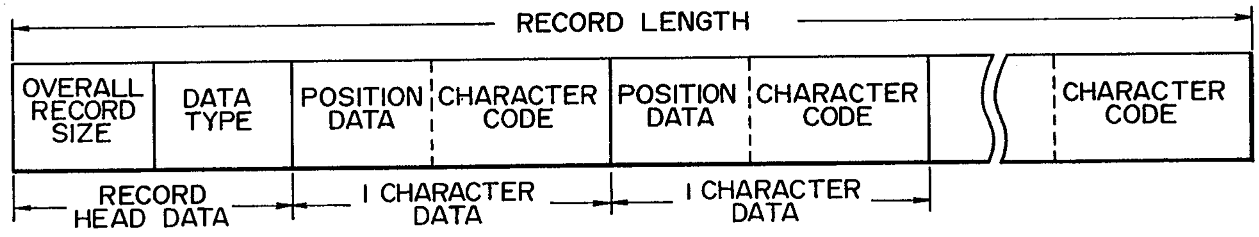

FIG. 11

| ITEM / NUMBER | PAPER FEED DIRECTION Lengthwize/ Breadthwize | PAGE DIRECTION Portrait/ Landscape | DRINT DIRECTION Vertical/ Horizontal | GYO DIRECTION | MOJI DIRECTION (DIRECTION OF "A") | LF DIRECTION | RELATION BETWEEN GYO DIRECTION AND LF DIRECTION |
|---|---|---|---|---|---|---|---|
| 51a | L | P | V | DOWN ↓ | A | LEFT ← | GYO DIRECTION → / LF DIRECTION ↓ |
| 51b | | | H | RIGHT → | A | DOWN ↓ | |
| 51c | | L | V | RIGHT → | ᐊ | DOWN ↓ | |
| 51d | | | H | UP ↑ | ᐊ | RIGHT → | |
| 51e | B | P | V | RIGHT → | ᐊ | DOWN ↓ | |
| 51f | | | H | UP ↑ | ᐊ | RIGHT → | |
| 51g | | L | V | DOWN ↓ | A | LEFT ← | |
| 51h | | | H | RIGHT → | A | DOWN ↓ | |
| 52a | L | P | V | DOWN ↓ | A | LEFT ← | |
| 52b | | | H | RIGHT → | A | DOWN ↓ | |
| 52c | | L | V | RIGHT → | ᐊ | DOWN ↓ | |
| 52d | | | H | DOWN ↓ | ᐅ | LEFT ← | |
| 52e | B | P | V | RIGHT → | ᐊ | DOWN ↓ | |
| 52f | | | H | DOWN ↓ | ᐅ | LEFT ← | |
| 52g | | L | V | DOWN ↓ | A | LEFT ← | |
| 52h | | | H | RIGHT → | A | DOWN ↓ | |
| 81a | L | P | ARABIC | LEFT ← | A | DOWN ↓ | GYO DIRECTION ← / LF DIRECTION ↓ |
| 81b | | L | | DOWN ↓ | ᐊ | RIGHT → | |
| 81c | B | P | | DOWN ↓ | ᐊ | RIGHT → | |
| 81d | | L | | LEFT ← | A | DOWN ↓ | |

FIG. 15

IMAGE RECORDING APPARATUS

This application is a continuation of application Ser. No. 779,107 field Sept. 23, 1985, now abandoned.

BACKGROUND OF THE INVENTION

1. Field of the Invention

The present invention relates to an image recording apparatus for forming an image on a record medium.

2. Description of the Prior Art

FIG. 1 illustrates longitudinal (or lengthwise) feed and lateral (or breadthwise) feed of a record sheet (or paper). Numeral 1*a* denotes a cut sheet which is longitudinally fed, numeral 1*b* denotes a cut sheet which is fed laterally, numeral 1*c* denotes a continuous sheet which is fed longitudinally, numeral 1*d* denotes a continuous sheet which is fed laterally, and numeral 1*e* denotes an arrow which indicates a feed direction.

FIG. 2 illustrates a page direction of the record sheet, numeral 2*a* denotes a portrait document in which a direction of characters coincides to the longitudinal direction of the record sheet, and numeral 2*d* denotes a landscape document in which the direction of characters is orthogonal to the longitudinal direction of the record sheet.

FIG. 3 illustrates a print direction of a recording apparatus, numeral 3*a* denotes a longitudinally printed document in which characters are printed downward from right top as viewed in the direction of characters and line shift is done leftward, and numeral 3*b* denotes a laterally printed document in which characters are printed rightward from left top as viewed in the direction of characters and line shift is done downward. The print directions in the longitudinally printed document 3*a* and the laterally printed document 3*b* are based on the longitudinal print and lateral print commonly used in Japanese text and European text.

There are following three record formats on the record sheet.

(1) The feed direction formats of the record sheet are lateral (or breadthwise) feed and longitudinal (or lengthwise) feed.

(2) The page direction formats are portrait and landscape.

(3) The print direction formats of the recording apparatus are longitudinal print and lateral print.

When an image on the record sheet is to be defined in accordance with the formats (1)–(3), one L record format out of $2^3=8$ formats should be selected. In the prior art apparatus, an operator must manually operates in accordance with the character direction of the document and the feed direction of the record sheet while taking the formats (1)–(3) into consideration. Therefore, the print operation is complex and time consuming and the print efficiency is very low. In order to attain the record formats (1)–(3), complex processing by a host computer such as rearrangement of characters from the host computer to the recording apparatus or combination of print position shift instructions for respective characters is required, and a print command cannot be sent in a simple manner.

FIGS. 4(*a*)–4(*d*) and 5(*a*)–5(*d*) show image printouts by a prior art dual-side recording apparatus.

FIGS. 4(*a*) and 4(*b*) show printouts by the dual-side recording apparatus when a reversal axis A of the record sheet is parallel to a seam side of the record sheet. Numerals 101*a*, 101*b*, 102*a* and 102*b* denote record sheets having characters printed thereon and having seam sides. Record sheets 101*c* and 102*c* are prepared by joining the seam sides of the record sheets 101*a* and 101*b*, and the record sheets 102*a* and 102*b*, respectively. FIGS. 4(*c*) and 4(*d*) show printouts by the dual-side recording apparatus when the reversal axis A of the record sheet is orthogonal to the seam side of the record sheet. Numerals 103*a*, 103*b*, 104*a* and 104*b* denote record sheets having characters painted thereon and having the seam sides. Record sheets 103*c* and 104*c* are prepared by joining the record sheets 103*a* and 103*b*, and the record sheets 104*a* and 104*b*, respectively. In the record sheets 101*a* and 101*b*, the page direction is landscape (the characters are printed such that the character direction is orthogonal to the longitudinal direction of the record sheet), the print direction is lateral print and the feed direction is lateral feed (the record sheet is fed laterally as viewed in the record sheet feed direction B), and the line direction is orthogonal (90° rightward) to the record sheet feed direction B and the character direction is parallel to the record sheet feed direction B. In the record sheets 102*a* and 102*b*, the page direction is portrait (the characters are printed such that the character direction is parallel to the longitudinal direction of the record sheet), the print direction is lateral print and the feed direction is lateral feed (the record sheet is fed laterally as viewed in the record sheet feed direction B), and the line direction is parallel to the record sheet feed direction B and the character direction is orthogonal (90° rightward) to the record sheet feed direction. Dots in the record sheets 101*a*, 101*b*, 102*a*, 102*b*, 103*a*, 103*b*, 104*a* and 104*b* represent seaming holes.

As seen from FIG. 4, when the record sheets 101*a* and 101*b* and the record sheets 102*a* and 102*b* having the seam sides which are parallel to the reversal axes A of the record sheets are joined on the seam sides, the record sheets 101*c* and 102*c* having the characters printed in the same direction are prepared. On the other hand, when the record sheets 103*a* and 103*b* and the record sheets 104*a* and 104*b* having the seam sides which are orthogonal to the reversal axes A of the record sheets are joined on the seam sides, the record sheets 103*c* and 104*c* having different character directions are prepared.

FIGS. 5(*a*) and 5(*b*) show printouts by the dual-side recording apparatus when the seam sides of the record sheets are orthogonal to the reversal axes A of the record sheets. Numerals 111*a*, 111*b*, 112*a* and 112*b* denote record papers having characters printed thereon and having seam sides. When the record sheets 111*a* and 111*b* and the record sheets 112*a* and 112*b* are joined on the seam sides, record sheets 111*c* and 112*c* are prepared, respectively. FIGS. 5(*c*) and 5(*d*) show printouts by the dual-side recording apparatus when the seam sides of the record sheets are parallel to the reversal axes A of the record sheets. Numerals 113*a*, 113*b*, 114*a* and 114*b* denote record sheets having characters printed thereon and having seam sides. When the record sheets 113*a* and 113*b* and the record sheets 114*a* and 114*b* are joined on the seam sides, record sheets 113*c* and 114*c* are prepared. Dots on the record sheets 111*a*, 111*b*, 112*a*, 112*b*, 113*a*, 113*b*, 114*a* and 114*b* represent seaming holes.

As seen from FIG. 5, when the record sheets 111*a* and 111*b* and the record sheets 112*a* and 112*b* having the seam sides which are orthogonal to the reversal axes A of the record sheets are joined on the seam sides, the record sheets **111*c* and 112*c* having character directions are prepared. On the other hand, when the record sheets 113*a* and 113*b* and the record sheets 114*a* and 114*b* having the seam sides which are parallel to the reversal axes A of the record sheets are joined on the seam sides, the record sheets 113*c* and 114*c*** having the same character direction are prepared.

Thus, in the prior art dual-side recording apparatus, the character direction of the printed characters is uniquely determined independently of the relationship between the reversal axis A of the record sheet and the seam side of the record sheet. As a result, the characters printed on the joined record sheets **103*c*, 104*c*, 111*c* and 112*c*** are not in the proper positions so that when the dual-side printed record sheets are to be found, the record sheets must be reversed for each page.

If a record sheet can be fed only longitudinally because of a structural limitation of the printer, the characters are not properly printed on the both sides of the record sheet.

When the record sheets are to be found on shorter sides because of a special format but the record sheets are laterally fed such that the shorter sides of the record sheets are always parallel to the feed direction B of the record sheets, the character directions on the opposite pages are different if the dual-side printed record sheets are joined.

In the prior art apparatus, since the timings for writing the image and feeding the record sheets are fixed, the position of the image formed on the record sheet is uniquely determined by the image data.

As a result, if the image is at an undesired position on the record sheet, for example, if the image is formed on a left end of the record sheet, the image will be on the area where the seam holes are to be formed and the seaming holes cannot be formed, or the image on the record sheet may appear on a perforation line. In such cases, the image data must be reformed. When the images are to be formed on both sides of the record sheet, the image may be formed in an improper position on one side even if the image is formed in a proper position on the other side.

SUMMARY OF THE INVENTION

It is an object of the present invention to improve an image recording apparatus.

It is another object of the present invention to provide an image recording apparatus capable of forming a desired format of image.

It is other object of the present invention to provide an image recording apparatus capable of forming a desired image without a complex manipulation.

It is other object of the present invention to provide an image recording apparatus capable of forming a desired image output with a simple construction.

It is other object of the present invention to provide an improved dual-side recording apparatus It is other object of the present invention to provide a dual-side recording apparatus which eliminates disadvantages encountered in the dual-side recording.

It is other object of the present invention to provide a recording apparatus capable of shifting an image formed on a record medium to any desired position.

It is other object of the present invention to provide a recording apparatus capable of forming dual-side images with a simple construction.

Other objects of the present invention will be apparent from the following description of the invention when taken in conjunction with the accompanying drawings.

BRIEF DESCRIPTION OF THE DRAWINGS

FIG. 10 shows a combination table of the print formats, FIG. 11 illustrates a record format of a print data, FIG. 15 shows a combination table with a carriage return direction being taken into consideration.

DETAILED DESCRIPTION OF THE PREFERRED EMBODIMENTS

Figure 6:
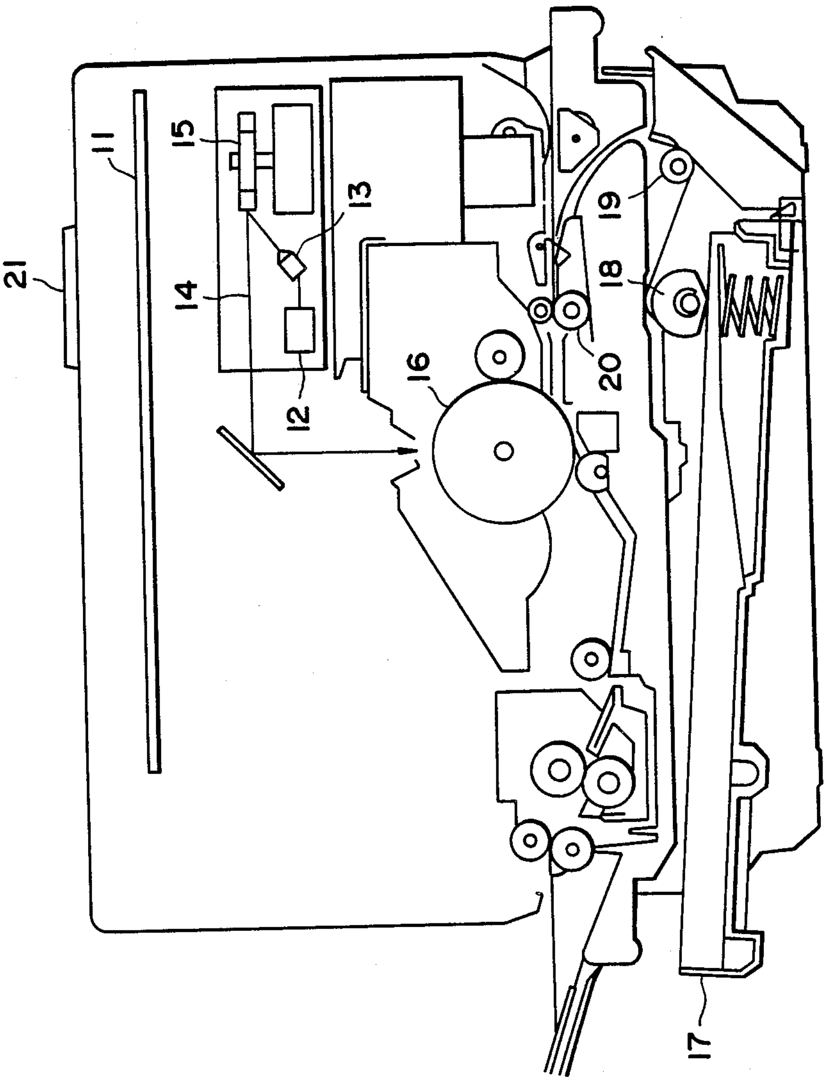
FIG. 6 is a sectional view of a recording apparatus in accordance with the present invention.

FIG. 6 is a sectional view of one embodiment of a recording apparatus of the present invention. Numeral 11 denotes a control board which controls a whole printer, analyzes data and generates an image signal, numeral 12 denotes an LD driver which turns on and off a light of a laser diode (LD) 13 based on the image signal from the control board, numeral 14 denotes a laser beam emitted by the LD 13, numeral 15 denotes a scanner which mechanically scans the laser beam 14, numeral 16 denotes a drum on which an image is formed by the laser beam 14 by a known electrographic technique, numeral 17 denotes a paper cassette in which record sheets are contained, numeral 18 denotes a feed roller which feeds the record sheet from the paper cassette 17, numeral 19 denotes a guide roller for properly conveying the record sheet fed by the feed roller 18, numeral 20 denotes a regist roller which temporarily stops the record sheet fed by the feed roller 18 and conveyed through the guide roller 19 and sends it to an image transfer position in synchronism with writing of the image onto the drum 16, and numeral 21 denotes an input port which receives a print data and control signals supplied from an external unit such as a host computer to the printer.

The feed of the record sheet and the preparation for image formation are now explained.

When the control board 11 issues a paper feed command, the paper feed roller 18 is driven and the record sheet contained in the paper cassette 17 is fed. The record sheet is guided by the guide roller 19 and temporarily held by the regist roller 20. On the other hand, the scanner 15 and the drum 16 reach the steady rotation states to be ready for one-page printing and wait for a print start signal.

Figure 7:
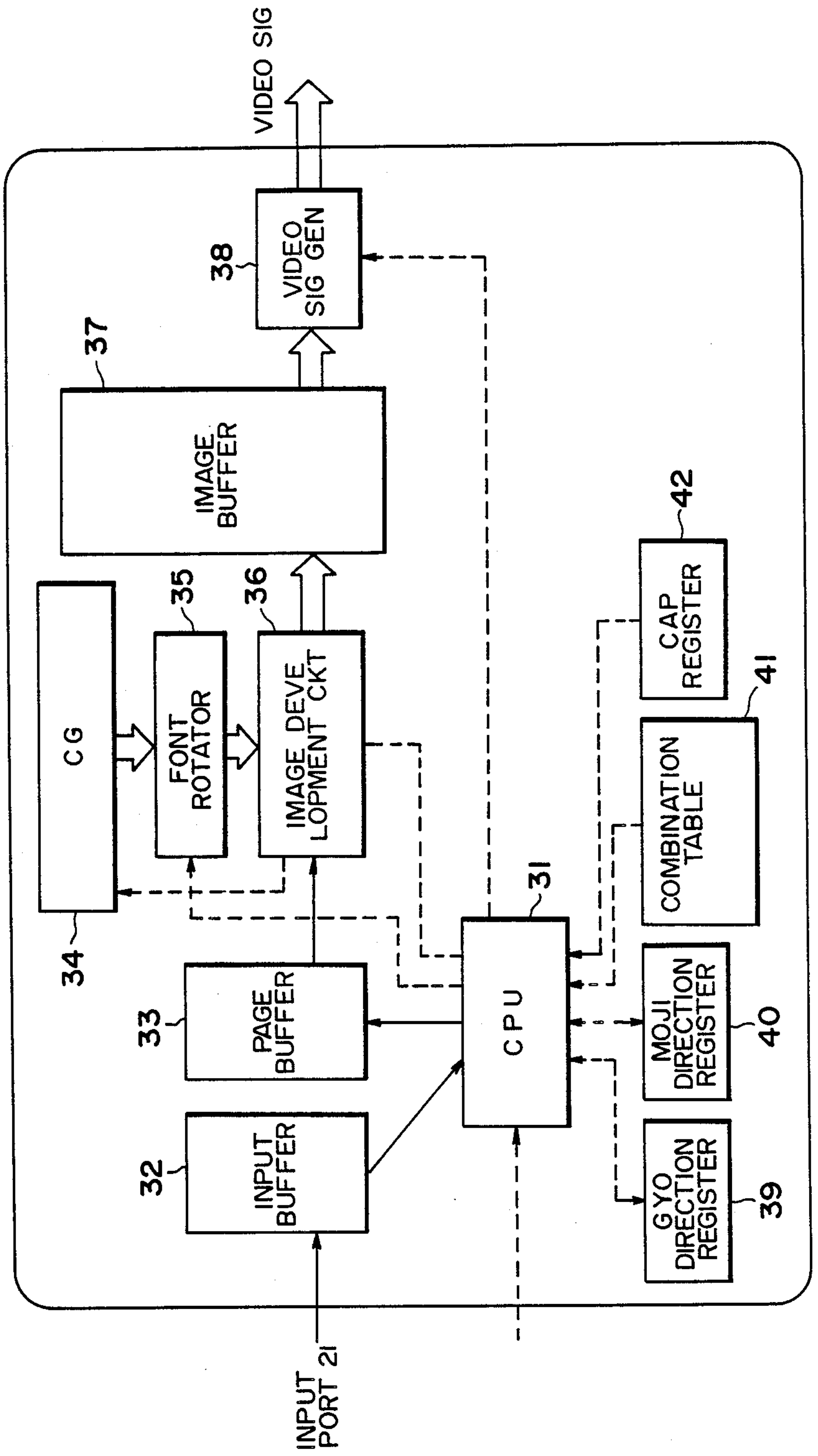
FIG. 7 is a control block diagram of a control board shown in FIG. 6, FIGS. 8 and 9 illustrate prior formats.

FIG. 7 shows a control block diagram of the control board 11 shown in FIG. 6. Numeral 31 denotes a central processing unit (CPU) which controls the entire system and analyzes input data, numeral 32 denotes an input buffer which temporarily stores the input data through the input port 21, numeral 33 denotes a page buffer which stores a print data analyzed by the CPU 31 and converted to a print format, numeral 34 denotes a character generator (CG) which generates character pattern information (dot patterns) for character codes, numeral 35 denotes a font rotator which rotates the character pattern information supplied from the CG 34 in accordance with a command from the CPU 31, and numeral 36 denotes an image development circuit which reads in the print data supplied from the page buffer 33 and develops the character pattern information supplied from the CG 34 on an image buffer 7 which stores the dot image developed by the image development circuit 36. Numeral 38 denotes a video signal generator which converts the dot image on the image buffer 37 to a video signal, numeral 39 denotes a GYO direction register (or line direction register) which indicates a character print direction or a line direction relative to the feed direction of the record sheet, numeral 40 denotes a MOJI direction register (or character direction register which indicates a character direction relative to the feed direction of the record sheet, numeral 41 denotes a combination table which includes combinations of line direction and character direction which are determined by combination of three factors, feed direction of the record sheet, page direction and print direction of the recording apparatus, and numeral 42 denotes a CPA register which stores a current active position or a print position (address) on the record sheet for a character to be printed. Fine solid line arrows shown in FIG. 7 indicate a flow of print data in a code format, thick solid line arrows indicates a flow of print data in a message format, and broken line arrows indicate a flow of control information.

Figure 8:
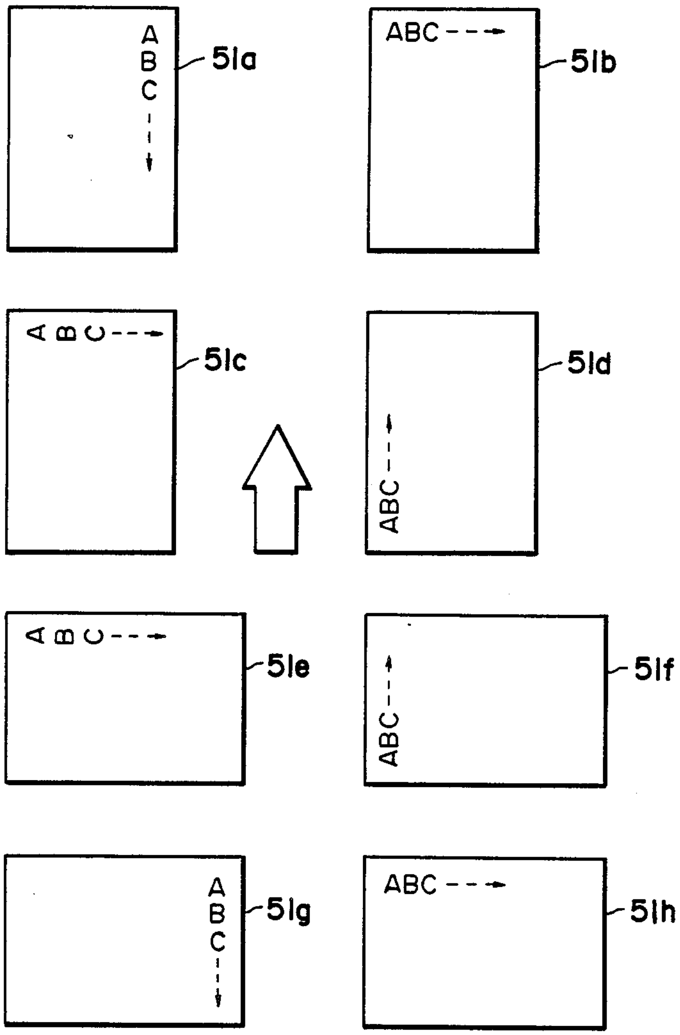
Figure 9:
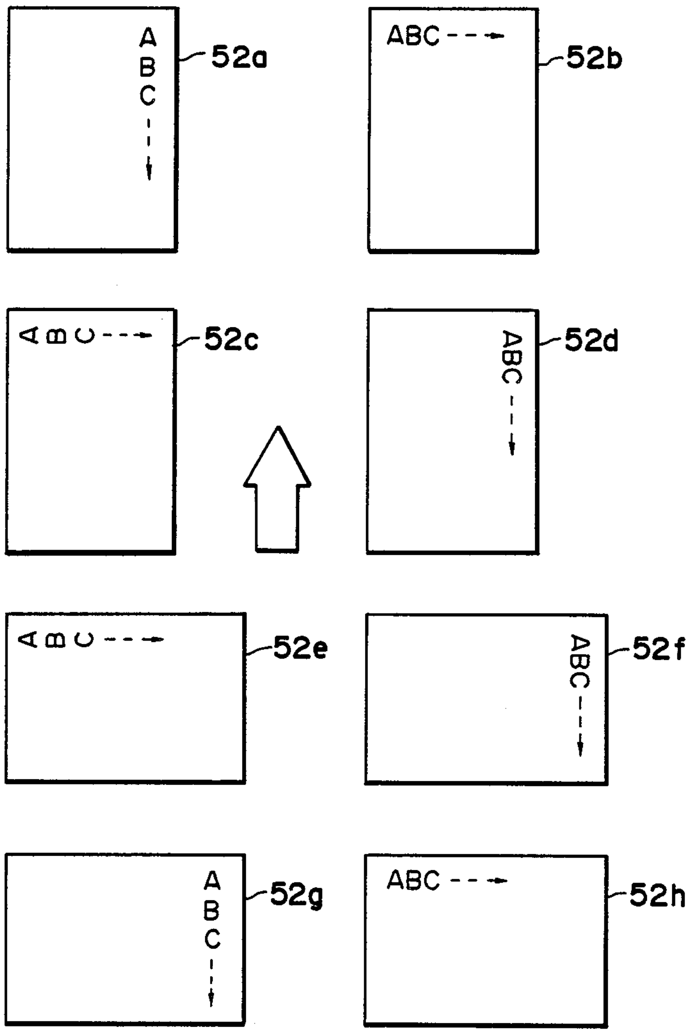

Referring to FIGS. 8 and 9, the print format of the recording apparatus is explained.

Figure 2:
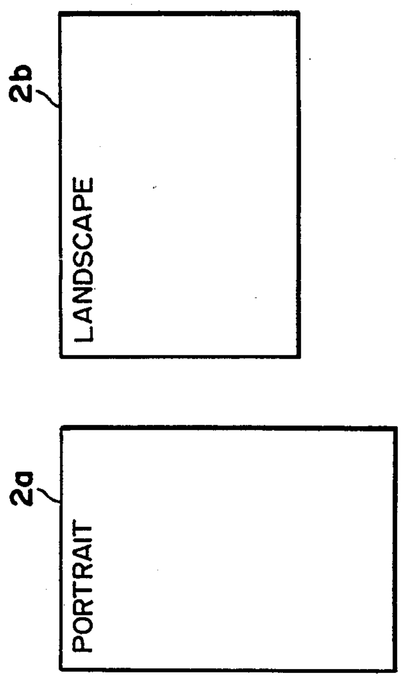
FIG. 2 PRIOR ART
FIG. 2 illustrates a page direction of the record sheet.
Figure 3:
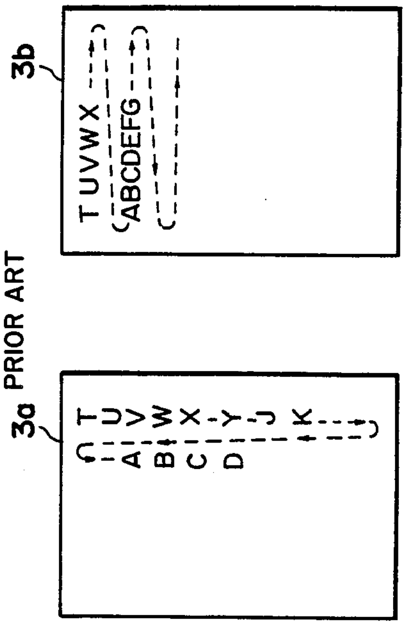
FIG. 3 PRIOR ART
FIG. 3 illustrates a print direction of a recording apparatus.
Figure 1:
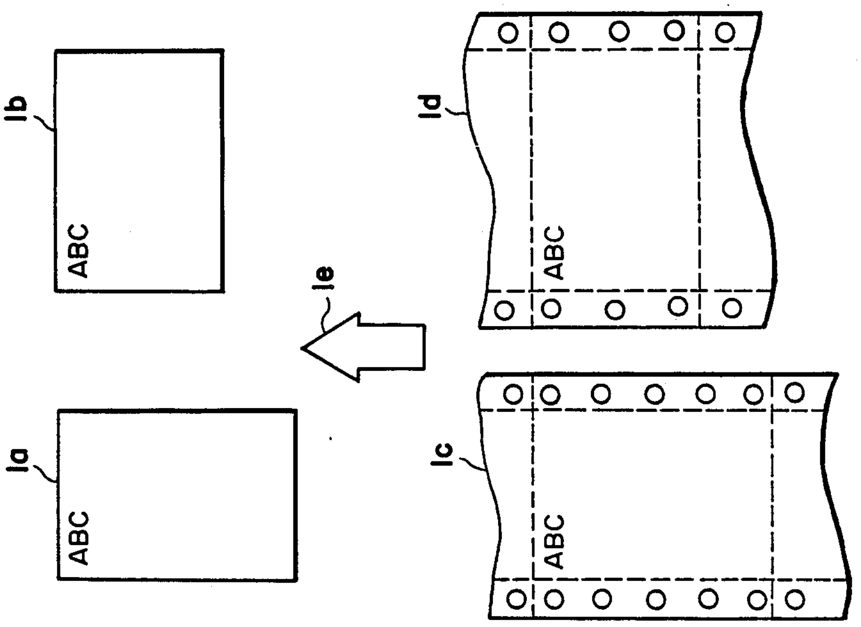
FIG. 1 PRIOR ART
FIG. 1 illustrates longitudinal feed and lateral feed of a record sheet.

The print formats of the record sheet shown in FIGS. 1 to 3 include record sheet feed direction, page direction and recording apparatus print direction. Direction information necessary for the print operation of the recording apparatus are the GYO direction (or line direction) relative to the feed direction of the record sheet and the MOJI direction (or character direction)-relative to the feed direction of the record sheet. Combinations of the line direction and the character direction should be selected from the combinations of the record sheet feed direction, page direction and recording apparatus print direction.

FIGS. 8 and 9 show combinations of the line direction and character direction selected from $2^3$ combinations of the record sheet feed direction, page direction and recording apparatus print direction. Center arrows in FIGS. 8 and 9 indicate the feed direction of the record sheet.

In FIG. 8, numerals *51a–51h* denote printed documents. The record sheets are fed in the direction of the arrow. Broken line arrows shown the line direction.

In FIG. 9, numerals *52a–52h* denote printed documents. The record sheets are fed in the direction of the arrow. Broken line arrows indicate the line direction.

The documents *51a–51h* and *52a–52h* are first classified by the record sheet feed direction of the print formats. The documents *51a–51d* and *52a–52d* are longitudinally fed documents, and the documents *51e–51h* and *52e–52h* are laterally fed documents. When the documents *51a–51h* and *52a–52h* are classified by the page direction, the documents *51a, 51b, 51e, 51f, 52a, 52b, 52e* and *52f* are portrait documents, and the documents *51c, 51d, 51g, 51h, 52c,* documents, and the documents *51c, 51d, 52g, 51h, 5 2c, 52d, 52g* and *52h* are landscape documents. When the documents *51a–51h* and *52a–52h* are classified by the recording apparatus print direction, the documents *51a, 51c, 51e, 51g, 52a, 52c, 52e* and *52g* are longitudinally printed documents and the documents *51b, 51d, 51f, 51h, 52b, 52d, 52f* and *52h* are laterally printed documents. Those combinations classified by items are shown in FIG. 10. The combinations shown in FIG. 10 are stored in the combination table 41 shown in FIG. 7 In FIG. 10, the combinations stored in the combination table 41 may be either one set of *51a–51h* or *52a–52h*.

The documents *51a–51h* shown in FIG. 8 show all print combinations printed by the recording apparatus when three GYO (or line) directions and two MOJI (or character) directions are combined, and the documents *52a–52h* shown in FIG. 9 show all print combinations printed by the recording apparatus when two line directions and three character directions are combined. By those combinations, all of the $2^3$ combinations of the record sheet feed direction (lengthwise/breadthwise or longitudinal/lateral), page direction and recording apparatus print direction can be attained. It is a minimum combination. A difference between the documents *51a–51h* shown in FIG. 8 and the documents *52a–52h* shown in FIG. 9 resides in that the documents **51*d* and *52d* and the documents *51f* and *52f*** are 180° rotated from each other.

Referring to FIG. 11, a record format when a series of print data applied to the input port 21 is stored in the page buffer 33 is explained. Numeral 61 denotes a record length. One record comprises a record head data 62 and a plurality of one-character data 63. The record head data 62 includes an overall record length and types of data in the record (one-byte character code, two-byte character code, image data, etc.), and the one-character data 63 includes position information (xy coordinate) of the character on a record sheet and a character code of the character.

Referring to FIG. 7, the control operation of the recording apparatus of the present embodiment is explained.

In one-page printing, the CPU 31 must detect the line direction and the character direction. To this end, the CPU 31 detects the three direction information, the record sheet feed direction, page direction and recording apparatus print direction.

The record sheet feed direction information is detected by detecting the type of the paper cassette 17 (FIG. 6), and the page direction information and the recording apparatus print direction information are designated by an initial default value of the printer (which is automatically set by the recording apparatus if there is no instruction) or designated by a control command applied to the input port 21. The CPU 31 determines the line direction data and the character direction data for the combination of the above information by referencing the combination table 41 and sets those data in the line direction register 39 and the character direction register 40. After setting, the input data from the input port 21 is temporarily stored in the input buffer 32. The CPU 31 analyzes the input data in the input buffer 32 by referencing the line direction register 39 and the CAP register 42 and converts it to a print data, which i stored in the page buffer 33. The CPU 31 then determines a position of a character to be next printed based on the current position in the CAP register 42 in accordance with the information in the line direction register 39, and registers the next character position in the CAP register 42. When one page of print data has been stored in the page buffer 33, the CPU 31 refers the character direction register 40 and supplies the character direction information to the font rotator 35. More specifically, the CPU 31 reads the content of the character direction register 40 and supplies a control signal issued based on the read data to the font rotator 35. The font rotator 35 can rotate the dot pattern supplied from the CG 34 by any multiple of 90 degrees. The image development circuit 36 reads the print data of the page buffer 33, supplies a control signal issued based on the character code to the CG 34 and obtains the character pattern information from the font rotator 35. The character pattern from the CG 34 is rotated by the font rotator 35 in accordance with the character direction information from the CPU 31. The image development circuit 36 develops the character pattern into a dot image at positions on the image buffer 37 designated by the character position information in the print data. As one page of print data is developed on the image buffer 37, the CPU 31 sends a print start signal to a video signal generator 38. In response thereto, the video signal generator 38 converts the dot image in the image buffer 37 to a video signal, which is sent to the LD driver 12. The video signal is converted to the on/off laser beam 14 emitted by the LD 13 which is driven by the LD driver 12. The laser beam 14 scans the drum 16 by the scanner 15 to form a toner image on the drum 16 by a known electrographic process, and the toner image is transferred to a record sheet fed to the drum 16 from the regist roller 20, by the print start signal.

In this manner, the characters can be printed at any positions on the record sheet by the position information shown in FIG. 11. The line direction can be changed by changing the shift direction of the character print position for each character, and the character direction can be easily changed by the font rotator 35. Since the possible combination of the three direction information, that is, record sheet feed direction, page direction and recording apparatus print direction are stored in the combination table 41, any print format can be obtained by referencing the combination table 41. The page direction and print direction may be designated by an operator through keys of a console panel (not shown) of the recording apparatus of FIG. 6.

Figure 12:
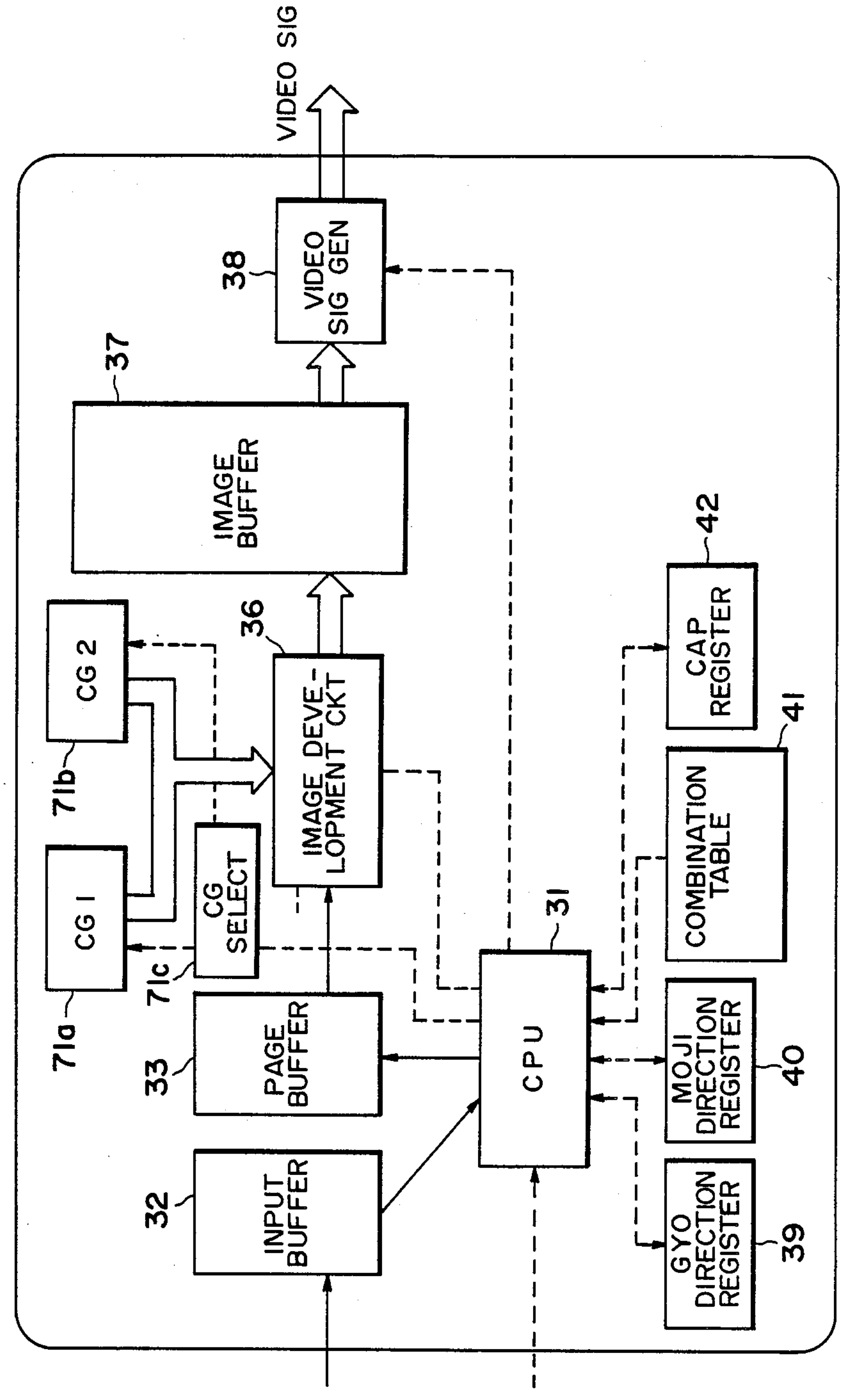
FIG. 12 is a control block diagram of a control board in a second embodiment.

FIG. 12 is a control block diagram of a control board in a second embodiment of the present invention. The like blocks to those shown in FIG. 7 are designated by the like numerals. Numerals 71*a* and 71*b* denote character generators (CG) which generate character patterns of different directions from each other, for example, rotated and non-rotated character patterns.

For example, the CG 71*b* generates the 90°-rotated character patterns. Numeral 71*c* denotes a CG selector which selects one of the CGs 71*a* and 71*b*.

The operation is now explained. As the CPU 31 sets the CG selector 71*c* in accordance with the character direction read from the character direction register 40, the CG selector 71*c* selects one of the CGs 71*a* and 71*b* in accordance with the character direction. The image development circuit 36 sends the character code to the selected CG 71*a* or 71*b*. Thus, the character pattern information in the desired character direction is supplied to the image development circuit 36.

Because the rotated and non-rotated character patterns are generated by the separate CGs 71*a* and 71*b*, a delay of processing time by the rotation of the character pattern is avoided in a printer having a small number of characters such as a one-byte character code printer. Further, since the font rotator 35 shown in FIG. 7 can be omitted, the circuit configuration of the control board 11 can be simplified. In the configuration shown in FIG. 12, as many CGs as the number of the character directions are required. In order to minimize the number of CGs necessary for the rotation of the character pattern, it is desirable to adopt the combination table of two character directions and three line directions shown in FIG. 8.

Figure 13:
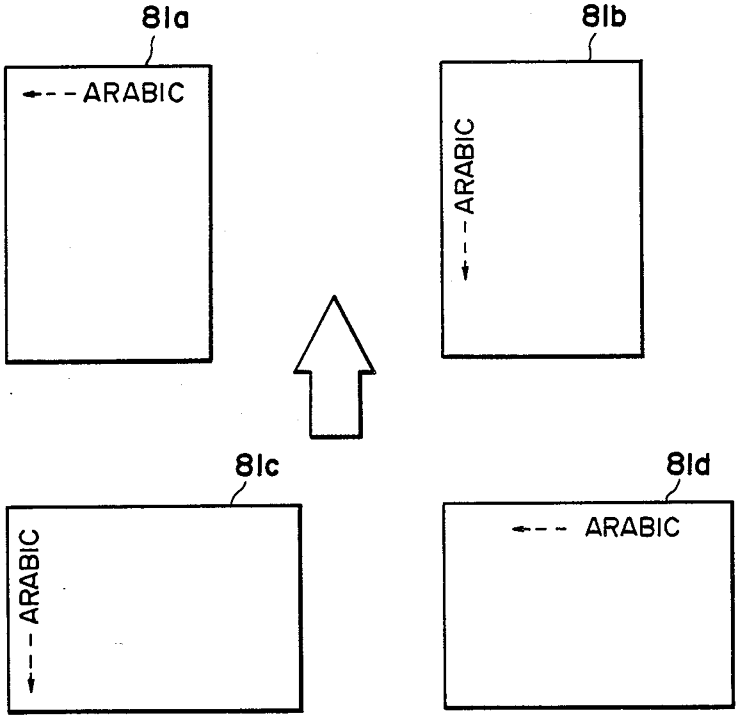
FIG. 13 shows an Arabian document.
Figure 14:
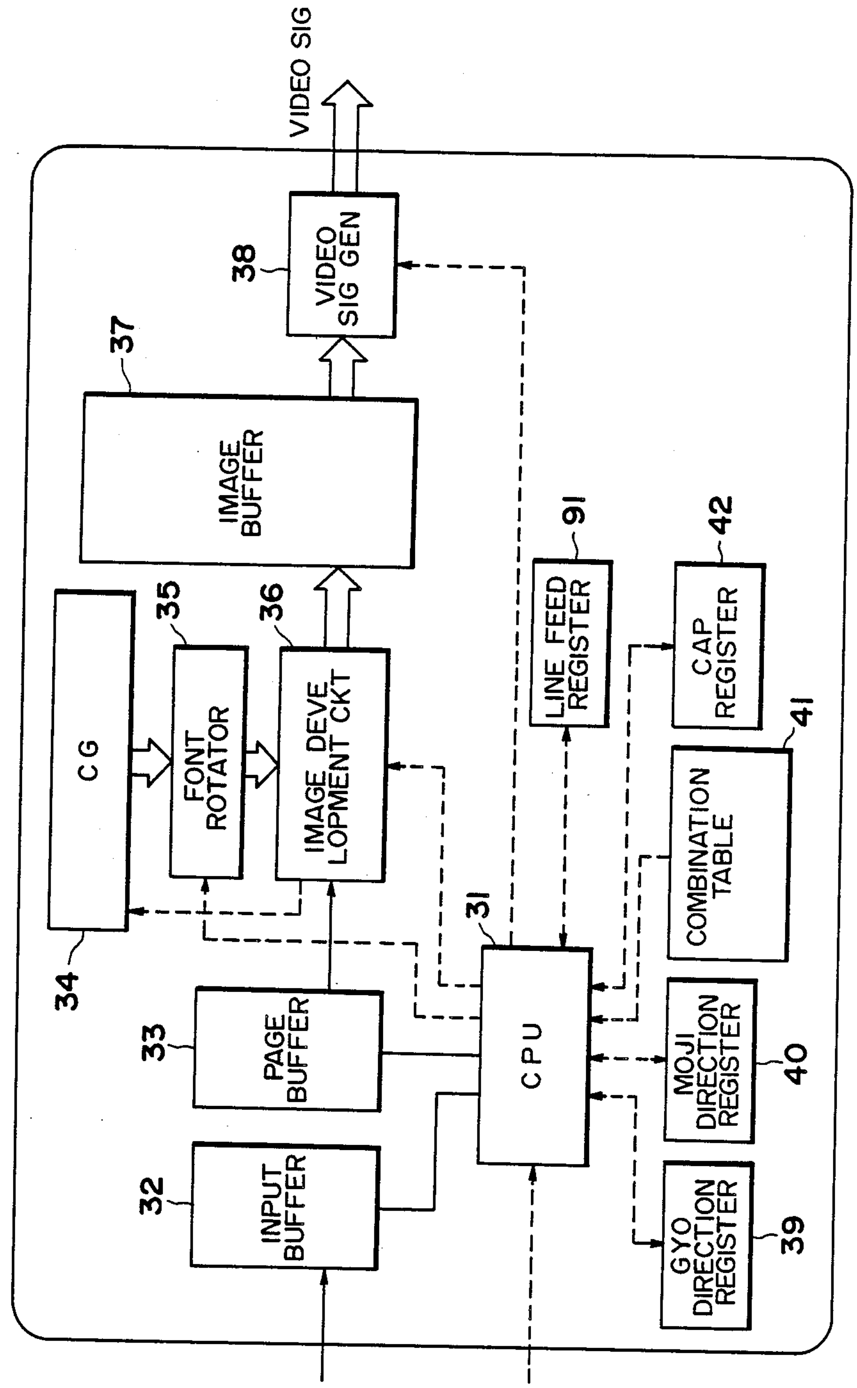
FIG. 14 is a control block diagram of a control board in a third embodiment.

Referring to FIGS. 13–15, printing of a specific format of document such as an Arabic document is explained. So far, the operation based on Japanese and European documents has been explained. In the Japanese and European documents, the line direction and a line feed (LF) direction are same whether the print direction of the recording apparatus is lateral or longitudinal. Accordingly, the LF direction information is not necessary so long as the line direction is known. In Arabic documents 81*a*–81*d* shown in FIG. 13 (in which an arrow indicates a record sheet feed direction), the line direction and the LF direction are not same and the print operation must be carried out with the LF direction being taken into consideration.

FIG. 14 shows a control block diagram of a control board of a third embodiment, in which the like blocks to those shown in FIG. 7 are designated by like numerals. Numeral 91 denotes an LF direction register which stores the LF direction data by a command from the CPU 31. The combination table 41 stores a combination table shown in FIG. 15.

The operation is now explained. The CPU 31 refers the combination table 41 by the record sheet feed direction information, page direction information and recording apparatus print direction information, refers the line direction information, character direction information and LF direction information, and sets the direction information into the line direction register 39, character direction register 40 and LF direction register 91. When a carriage return takes place while the CPO 31 analyzes the input data, the CPU 31 refers the LF direction register 91 and updates the content of the CAP register 42. The subsequent operation is similar to the operation of FIG. 7 and hence the explanation thereof is omitted.

In the recording apparatus having a function of printing the Arabic, there are four (up, down, left and right) character shift directions relative to the character direction and two (left and right) LF directions relative to the character shift direction. Accordingly, there are light print directions. In the configuration of FIG. 14, the print directions shown in FIG. 15 are set in the combination table 41.

Figure 16:
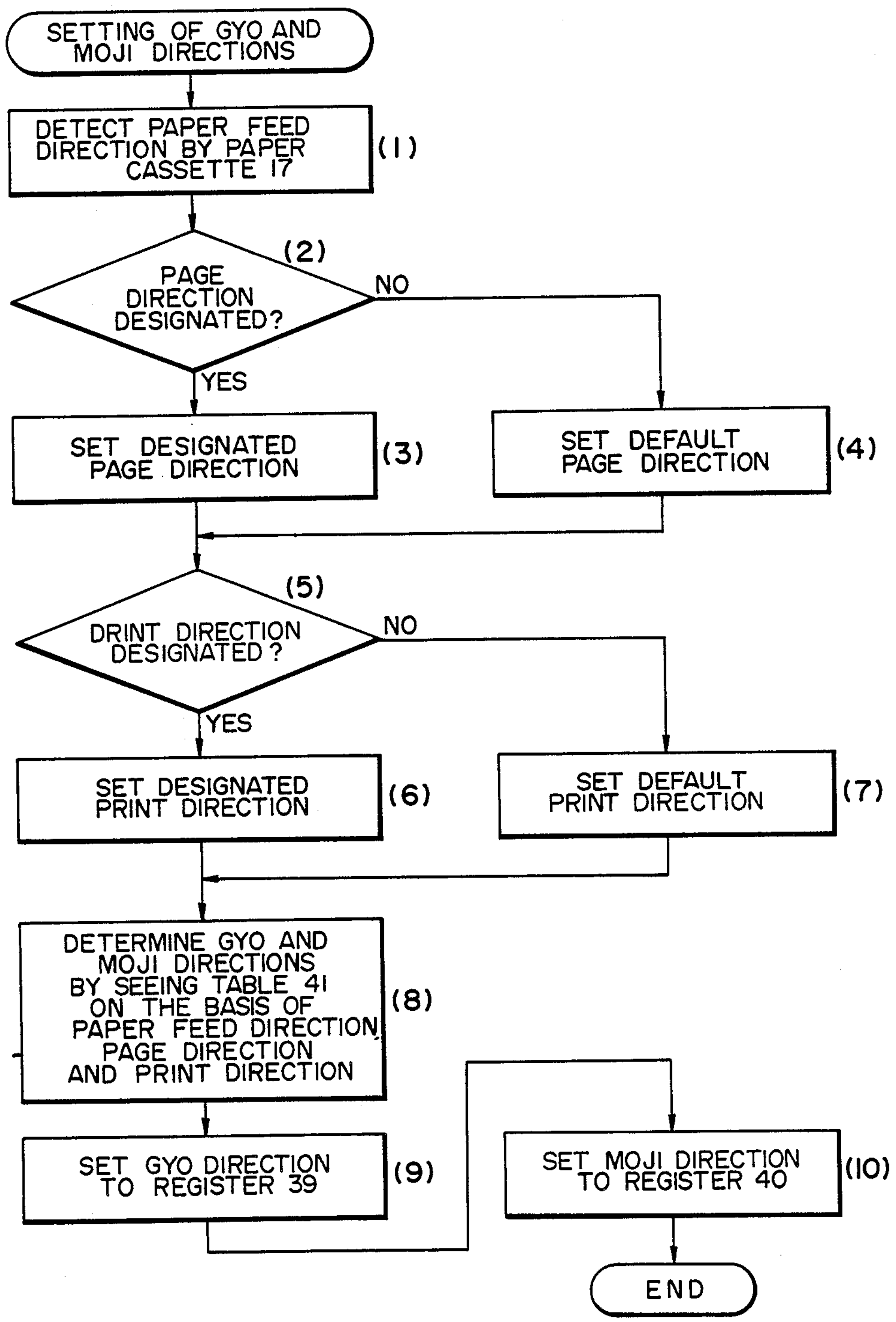
FIGS. 16–18 show flow charts of the operation of the recording apparatus in the third embodiment.
Figure 17:
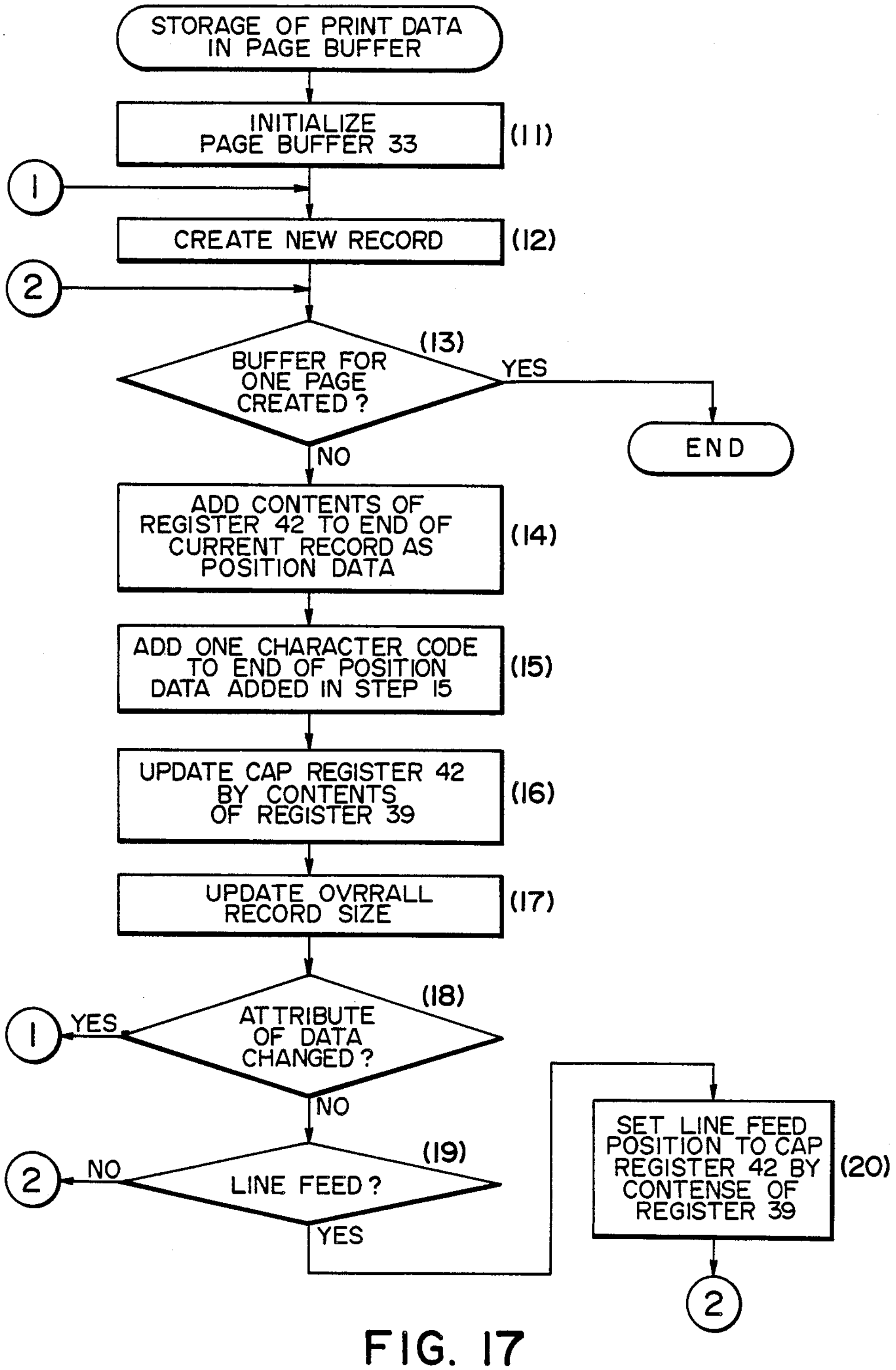
Figure 18:
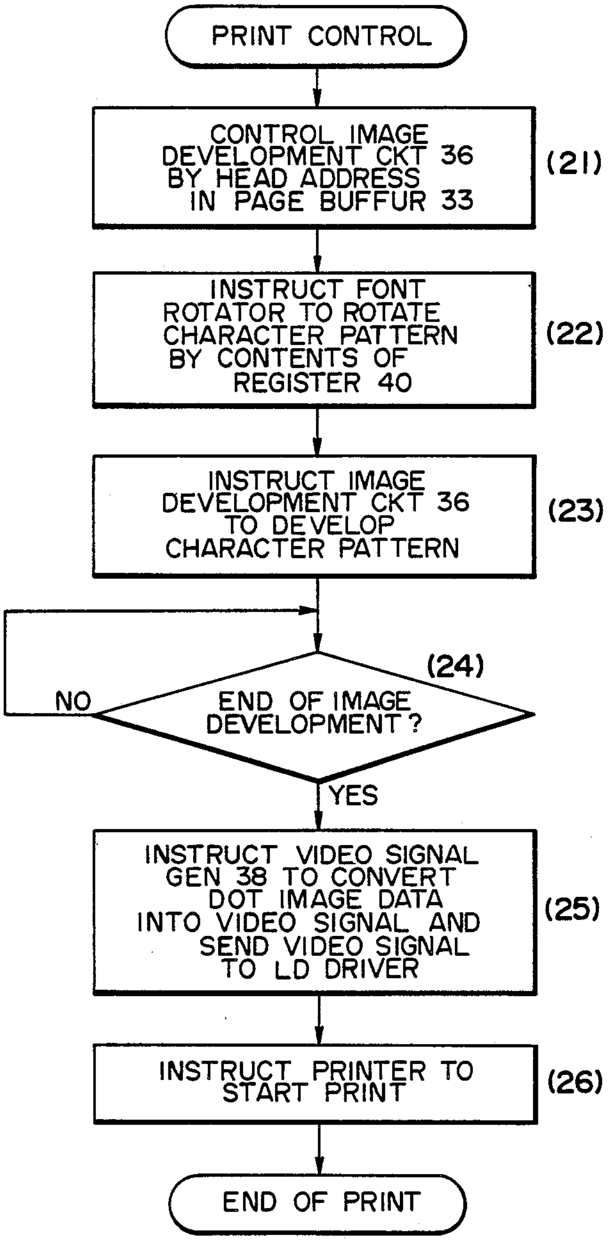

Referring to a flow chart of FIG. 16, setting of the line direction and character direction is explained. Flow charts shown in FIGS. 16, 17 and 18 are programmed and stored in a ROM of the CPU 31. Those flow charts are explained primarily based on the circuit of FIG. 7. Numerals (1)-(10) denote steps.

When the CPU 31 detects (1) the record sheet feed direction of the record sheet fed from the paper cassette 17, the CPU 31 checks (2) if the page direction (portrait or landscape) is designated by a control code in the input data or an external command, and if YES, sets (3) the designated page direction, and if NO, sets (4) a default page direction. Then, the CPU 31 checks (5) if the print direction (vertical or horizontal) is designated, and if YES, sets (6) the designated print direction, and if NO, sets (7) a default print direction. Then, the CPU 31 refers the combination table 41 based on the record sheet feed direction, page direction and L print direction obtained in the steps (1)-(7) to determine (8) the line direction and character direction, sets (9) the determined line direction in the line direction register 39, and sets (10) the character direction determined in the step (8) in the character direction register 40. The setting of the line direction and character direction is carried out prior to one-page print operation.

Referring to FIG. 17, storing of the print data into the page buffer 33 is explained. Numerals (11)-(20) denote steps.

In order to store a new print data, the page buffer 33 is initialized (11) and a new record is formed (12). This means that the record head data 62 of the record shown in FIG. 11 is newly created. The overall record length 61 and the type of data, for example, a code indicating attributes of the data is set in the record head information 62. Then, the CPU 31 examines the input buffer 32 to check (13) if one-page processing has been completed, and if YES, terminates the preparation of one-page buffer, and if NO, adds (14) the content of the CAP register 42, that is, the position information of the character to be next printed, to the last of the current record. Then, one character code is fetched from the input buffer 32 and added (15) to the last of the newly added position information, as the character code. Then, the content of the CAP register 42 is updated (16) to a position shifted by the character pitch in the direction designated by the line direction register 39, and the record length is updated (17) by the length of the one-character information added in the steps (14) and (15). The CPU 31 then checks (18) if there is a control information for changing the attribute of the data in the input data, and if YES, returns to the step (12), and if NO, the CPU 31 checks (19) if the line shift is required, and if NO, returns to the step (13), and if YES, sets (20) the line shift position into the CAP register 42 in accordance with the content of the line direction register 39 and returns to the step (13). The line direction on the page buffer 33 represents the shift direction of the position information for each character.

Referring to FIG. 18, the print control operation is explained. Numerals (21)-(26) denote steps.

The CPU 31 controls (21) the image development circuit 36 in accordance with the head address of the page buffer 33, and sends (22) a rotation command for the character pattern to the font rotator 35 in accordance with the content of the character direction register 40. After the rotation command for the character pattern has been sent, the CPU 31 commands (23) to the image development circuit 36 to start the development of the image of the character pattern. Then, it waits (24) for the completion of the development of the image, and when it is completed, the CPU 31 commands (25) to the video signal generator 38 to convert the dot image information stored in the image buffer 33 to a video signal, and sends a command to transfer the video signal to the LD driver 12. Then, the CPU 31 sends (26) the print start command to the printer.

Figure 19:
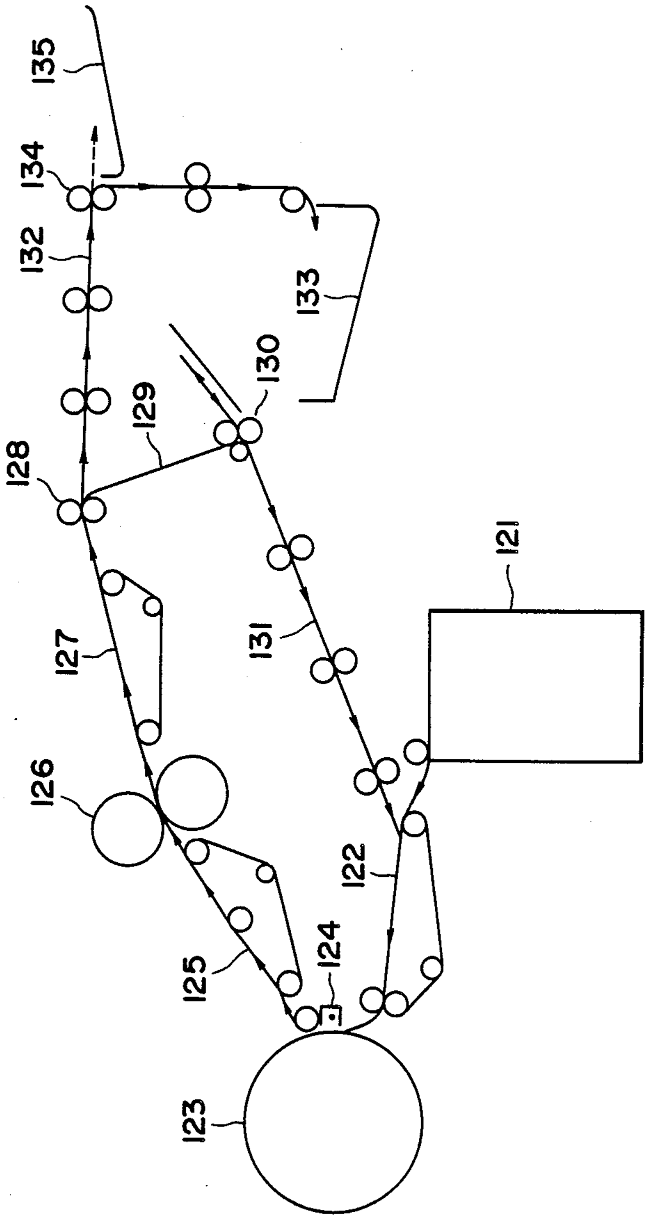
FIG. 19 shows a feed path in a dual-side recording apparatus in accordance with a fourth embodiment.

FIG. 19 illustrates a feed path in a fourth embodiment of a dual-side recording apparatus of the present invention. Numeral 121 denotes a paper feed unit, numeral 122 denotes a pre-transfer feed path, numeral 123 denotes a drum on which a toner image to be transferred to a surface of a record sheet is formed by a known electrographic process, numeral 124 denotes a transfer charger which transfers the toner image on the drum 123 to the record sheet, numeral 125 denotes a pre-fixing feed path, numeral 126 denotes a fixing unit for fixing the toner image transferred to the record sheet, by heat and pressure, numeral 127 denotes a post-fixing feed path, numeral 128 denotes a pre-reversal branch mechanism which branches the feed path of the record sheet, numeral 129 denotes a pre-reversal feed path, numeral 130 denotes a known reversal mechanism having three rollers for reversing the record sheet, numeral 131 denotes a post-reversal feed path, numeral 132 denote a pre-stacker feed path, numeral 133 denotes a stacker, numeral 134 denotes a pre-stacker branch mechanism and numeral 135 denotes an auxiliary tray.

The operation is now explained. In the dual-side print mode, the record sheet fed from the paper feed unit 21 is conveyed to the drum 123 through the pre-transfer feed path 122. The toner image formed on the drum 123 by the known electrographic process is transferred to the record sheet by a corona charge in the transfer charger 124, and the record sheet is conveyed to the fixing unit 126 through the pre-fixing feed path 125. The record sheet having the image fixed on a first side in the fixing unit 126 is conveyed through the post-fixing feed path 127 and fed to the reversal mechanism 130 through the pre-reversal branch mechanism 128 and the pre-reversal feed path 129.

The record sheet having characters printed on one side thereof is reversed in the reversal mechanism 30 and fed to the pre-transfer feed path 122 through the post-reversal feed path 131, and an image is transferred onto the rear side (second side) by the drum 23 and the transfer charger 124 in the same manner as the single-side printing. Then, the record sheet is fed to the fixing unit 126 through the pre-fixing feed path 25 where the image on the second side is fixed. Thus, the dual-side printing is completed.

The dual-side printed record sheet is conveyed through the post-fixing feed path 127, the pre-reversal branch mechanism 128, the pre-stacker feed path 132 and the pre-stacker branch mechanism 134 and stacked on the stacker 133.

Figure 20:
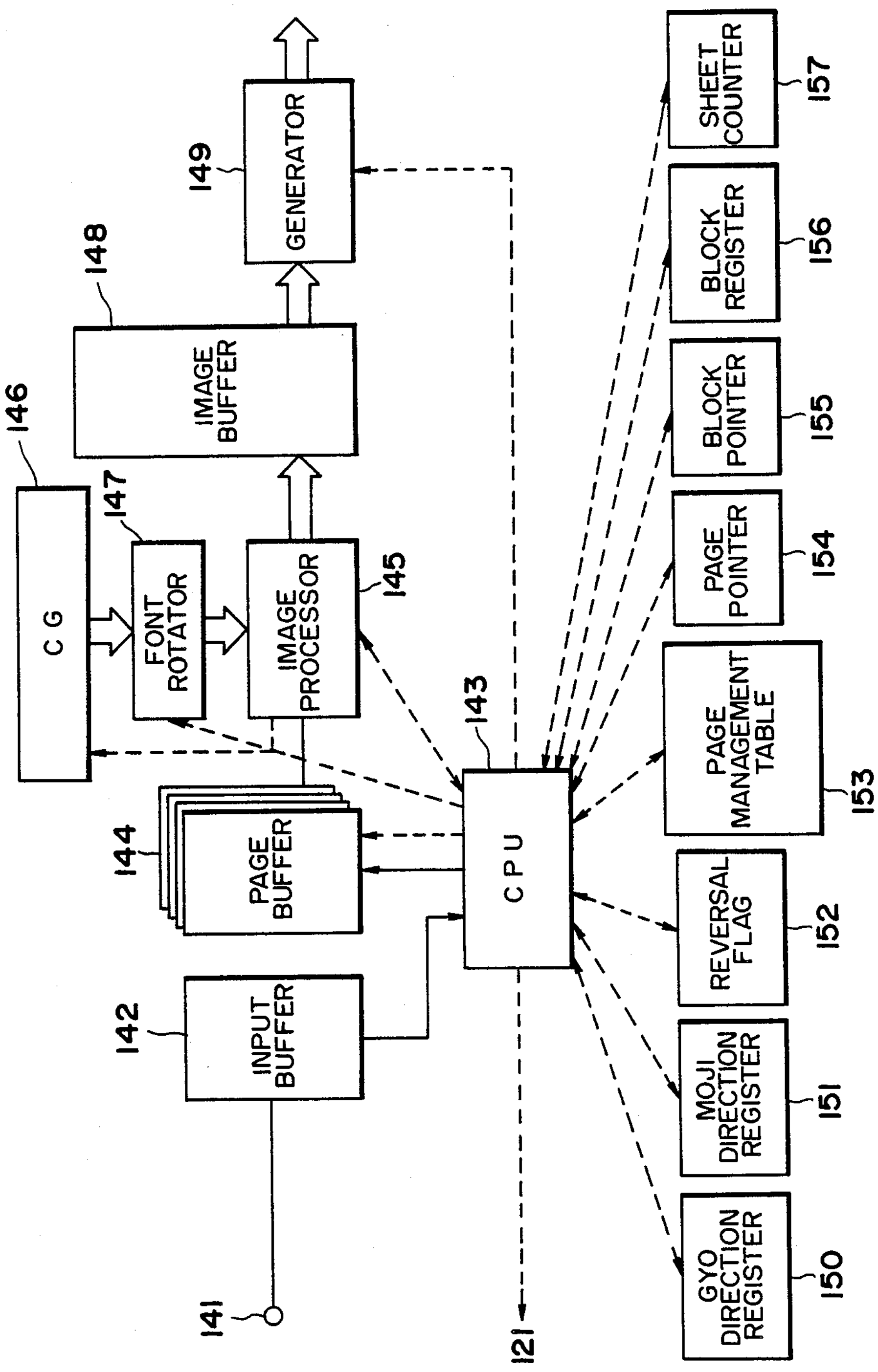
FIG. 20 is a control block diagram of the fourth embodiment of the dual-side recording apparatus.

FIG. 20 is a control block diagram of the dual-side recording apparatus shown in FIG. 19. Numeral 141 denotes an input port which receives an input data including a print data and control information from an external unit such as a host computer, numeral 142 denotes an input buffer which stores the input data supplied from the input port 141, numeral 143 denotes a central processing unit (CPU) which analyzes the input data and control the overall system, numeral 144 denotes a page buffer which stores one page of print data (image data), numeral 145 denotes an image processor which develops the data stored in the page buffer 144 into a dot image, numeral 146 denotes a character generator (CG) which stores character dot patterns, numeral 147 denotes a font rotator which can rotate the dot pattern supplied from the CG 146 by any multiple of 90 degrees, numeral 148 denotes an image buffer which stores one page of dot image, numeral 149 denotes a video generator which reads out the dot image from the image buffer 148 and converts it to a video signal, numeral 150 denotes a line direction register which indicates the line shift direction relative to the record sheet feed direction B (see FIGS. 4 and 5), numeral 151 denotes a character direction register which indicates the character direction relative to the record sheet feed direction B, and numeral 152 denotes a reversal flag which indicates reversal or non-reversal in the page direction for the dual-side printing of the record sheet. When the reversal flag 152 is "1" or ON, the page direction is reversed. Numeral 153 denotes a page control table which controls information for each page, numeral 154 denotes a page pointer which indicates a current print page, numeral 155 denotes a block pointer which indicates a page of a head block in the page control table 153, numeral 156 denotes a block register which indicates the number of record papers fed into the reversal feed loop, and numeral 157 denotes a sheet counter which counts the current print block.

The operation is now explained. The input data is applied to the input port 141 and stored in the input buffer 142. The CPU 143 sequentially reads the input data stored in the input buffer 142 and analyzes it and stores one page of buffer 144 into the page buffer 144. The page buffer 144 can store a plurality of pages of page information and can read out any page information. The CPU 143 sends an appropriate control information to the image processor 145 and commands to the image processor to print a selected page. Thus, the image processor 145 reads out the designated page information from the page buffer 144, reads in the character pattern corresponding to the character code in the page information from the CG 146 through the font rotator 147 and develops the character pattern into the dot image at appropriate position on the image buffer 148. After one page of image data has been developed on the image buffer 148, the CPU 143 sends a print start command to the video generator 149. The CPU 143 also sends a paper feed command to the paper feed unit 121. The video generator 149 modulates one page of image data on the image buffer 148 into the video signal, which is sent to the printer. The video signal modulates a laser beam emitted from a known laser which is driven by a known laser modulator (not shown) to convert it to an ON/OFF laser beam. The laser beam scans the drum 123 by a known scanner (not shown) to form a latent image on the drum 123. Then, the latent image on the drum 123 is transferred to the record sheet fed from the paper feed unit 121, by a known electrophotographic process.

The CPU 143 then initializes the registers, counters and pointers at the beginning of printing of a series of data in the following manner.

The CPU 143 first determines the page direction and the vertical or horizontal print based on the control information in the input data or the command or default information from an external unit. An operator may designate the page direction and the print direction by keys of a console panel (not shown) of the recording apparatus. The CPU 143 detects the longitudinal/lateral feed direction of the current record sheet fed from the paper feed unit 121 and determines the line direction and character direction relative to the record sheet feed direction B based on the combination of the page direction and the horizontal/vertical print, and sets them into the line direction register 150 and the character direction register 151.

The CPU 143 then checks a relationship between a direction along which perforations extend or a direction of a seam side and a reversal axis A of the record sheet. If the direction of the seam side is parallel to the reversal axis A of the record sheet, that is, for the record sheets 101*a* and 102*a* shown in FIG. 4, the record sheets 113*a* and 114*a* , 101*b* and 102*b*, and 113*b* and 114*b* shown in FIG. 5, the reversal flag 152 is turned off because, when both sides of the record sheets are printed in the same direction and the record sheets are joined along the seam sides, the character directions on the record sheets 101*c*, 102*c*, 113*c* and 114*c* are same.

On the other hand, when the seam direction of the record sheet is orthogonal to the reversal axis A of the record sheet, that is, for the record sheets 103*a* and 104*a*, 111*a* and 112*a*, 103*b* and 104*b* and 111*b* and 112*b*, the reversal flag 152 is turned on because, when both sides of the print sheets are printed in the same direction and the record sheets are joined along the seam sides, the character directions on the record sheets 103*c*, 104*c*, 111*c* and 112*c* are opposite. The information on the direction of the seam side of the record sheet may be inputted by the operator by the keys of the console panel of the printer.

As the input data is applied to the input port 141, the CPU 143 detects it, analyzes the input data stored in the input buffer 142, stores it in the page buffer 144 as a page data (including character codes), and updates the content of the page control table 153 each time one page of image data is formed. If an appropriate number of pages of page data are in the page buffer 144, the CPU 143 instructs to the image processor 145 to print the page designated by the page pointer 154. The CPU 143 designates a page buffer pointer in the page control table 153 by the page pointer 154 and instructs to the image processor 145 to print the page data in the page buffer 144 designated by the page buffer pointer. If the page number designated by the page pointer 154 is odd, that is, if an even/odd flag in the page control table 153 designated by the page pointer 154 is odd, the CPU 143 sends the information in the line direction register 150 and the character direction register 151 to the image processor 145 as they are, and if the page number designated by the page pointer 154 is even, that is, if the even/odd flag of the page in the page control table designated by the page pointer 154 is even, the CPU 143 examines the reversal flag 152, and if the reversal flag 152 is OFF, it means that the page directions in the dual-side printing of the record sheet are same, and the CPU 143 sends the information of the line direction register 150 and the character direction register 151 to the image processor 145 as they are. If the reversal flag 152 is ON, the page directions in the dual-side printing of the record sheet must be reversed. Accordingly, the information in the line direction register 150 and the character direction register 151 are reversely converted before they are sent to the image processor 145. The image processor 145 reads the designated page data stored in the page buffer 144, one character at a time, in accordance with the line direction and character direction information from the CPU 143, reads out the dot pattern of the character from the CG 146 and develops it onto the image buffer 148. The dot pattern which the image processor 145 read from the CG 146 is rotated by the font rotator 147 by a designated angle. Accordingly, the information in the character direction register 151 indicates the rotation angle of the font rotator 147. After the image development of one character, the image processor 145 reads out the next character from the page buffer 144 and develops the image adjacently to the previous character. The information in the line direction register 150 is used to update the position on the image buffer 148 for each character.

Figure 21:
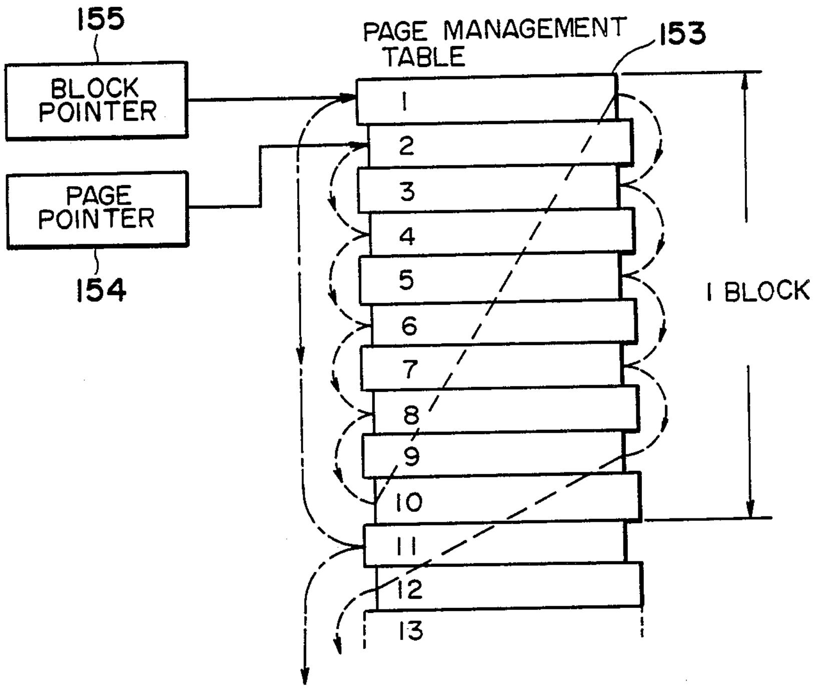
FIG. 21 illustrates a relationship between a page control table shown in FIG. 20, and a page pointer and a block pointer, FIGS. 22 (FIG. 22A and FIG. 22B) and 23 are flow charts showing a control operation of the fourth embodiment, FIGS. 24(*a*)–24(*d*) illustrate image printouts in the fourth embodiment.

Referring to FIG. 21, the feed control for the record sheet is explained. FIG. 21 illustrates a relationship between the page control table 153, and the page pointer 154 and the block pointer 155 shown in FIG. 20. Each of rectangles represents one page of page information and numeral in each rectangle represents a page number. The page information comprises a flag which indicates whether the page number is odd or even and information necessary to print one page of image data such as pointer to the page buffer 144 for that page. Solid line arrows indicate pages designated by the page pointer 154 and the block pointer 155, and broken line arrows indicate pages designated by the page pointer 154, that is, the transition of the printed pages, and chain line arrows indicate the transition of the pages designated by the block pointer 155. In FIG. 21, the number of sheets represents the number of record sheets in the reversal feed loop. The number of sheets is assumed to be five.

In the single-side print mode, it is necessary to stack the printed record sheets in face-down so that the printed record sheets are stacked in a right page sequence.

On the other hand, in the dual-side print mode, if the record sheets are ejected to the same stacker 133 as that used in the single-side print mode, the print side of the dual-side record sheet which was printed later is stacked in face down. Accordingly, in the dual-side print mode, the page having the larger page number (even page number if the printing starts from page 1) must be first printed before the previous odd page so that the record sheets are stacked in the stacker 133 in a right sequence.

If the number of sheets is five, that is, if a maximum number of sheets in the reversal feed loop is five, the pages should be printed in the sequence shown by the broken line arrows in FIG. 21. The even pages 2, 4, 6, 8 and 10 are printed on the record sheets fed from the paper feed unit 121, and after printing on the even page 10, the record sheet having the even page 2 printed thereon returns to the position of the drum 123 in the reversed face after the circulation through the reversal feed loop. Thus, the odd page 1 is printed on this record sheet. Thereafter, the odd pages 3, 5, 7 and 9 are sequentially printed on the back sides of the record sheets on which the even pages 4, 6, 8 and 10 have been previously printed. In this L manner, the odd pages 1–9 are printed on the record sheets on which the even pages 2–10 were previously printed and which were circulated through the reversal feed loop. Accordingly, the record sheet is not fed from the paper feed unit 21 during the printing of the odd pages. At the end of printing of the odd page 9, dual-side printing on five record sheets or ten pages is completed, and a print operation for the next block designated by the block pointer 155 is started. In a similar manner, the image data of the even page 12 is printed on a record sheet fed from the paper feed unit 121. The dual-side printing is carried out block by block until all image data are printed.

Figure 22A:
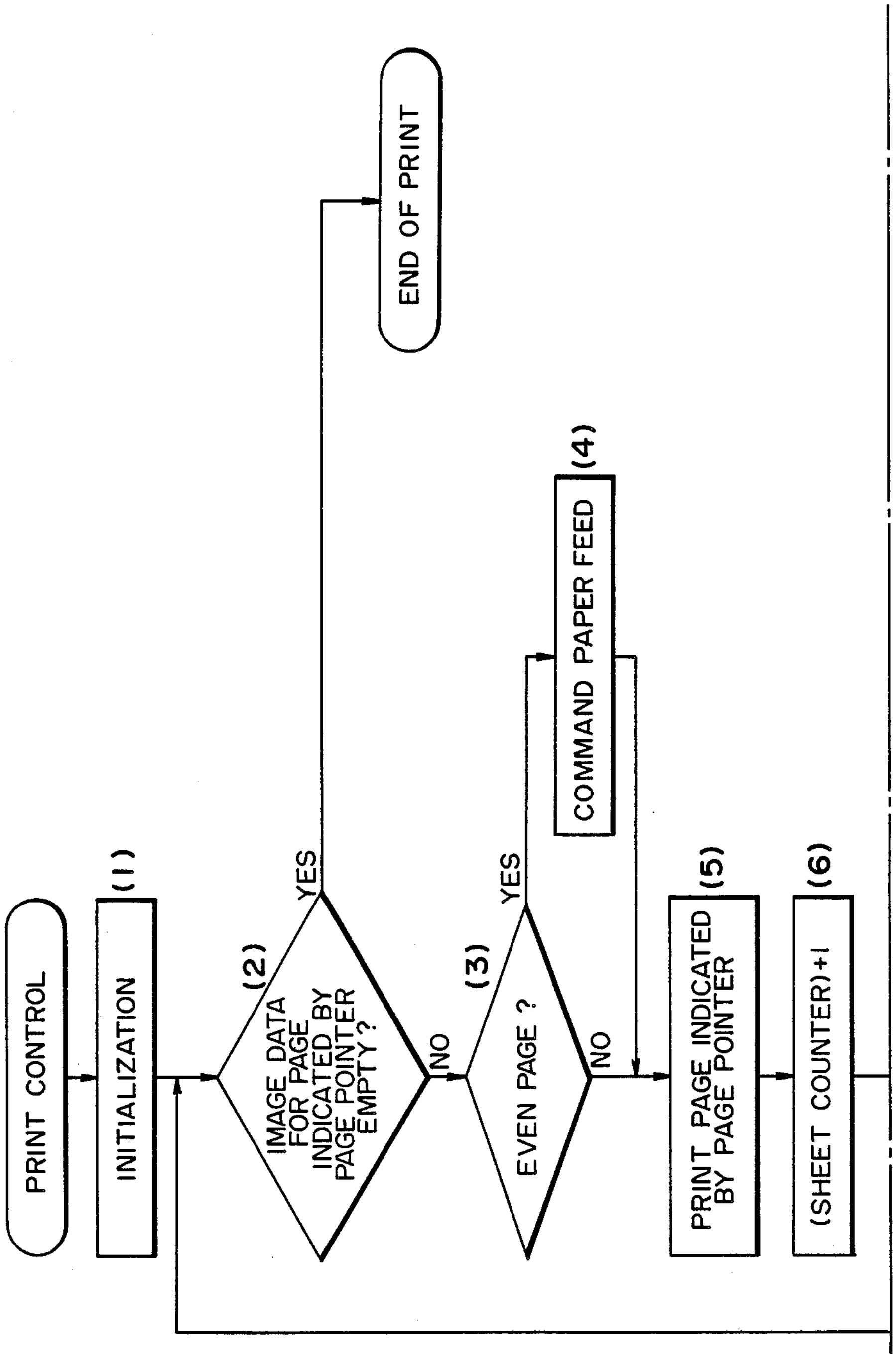
Figure 22B:
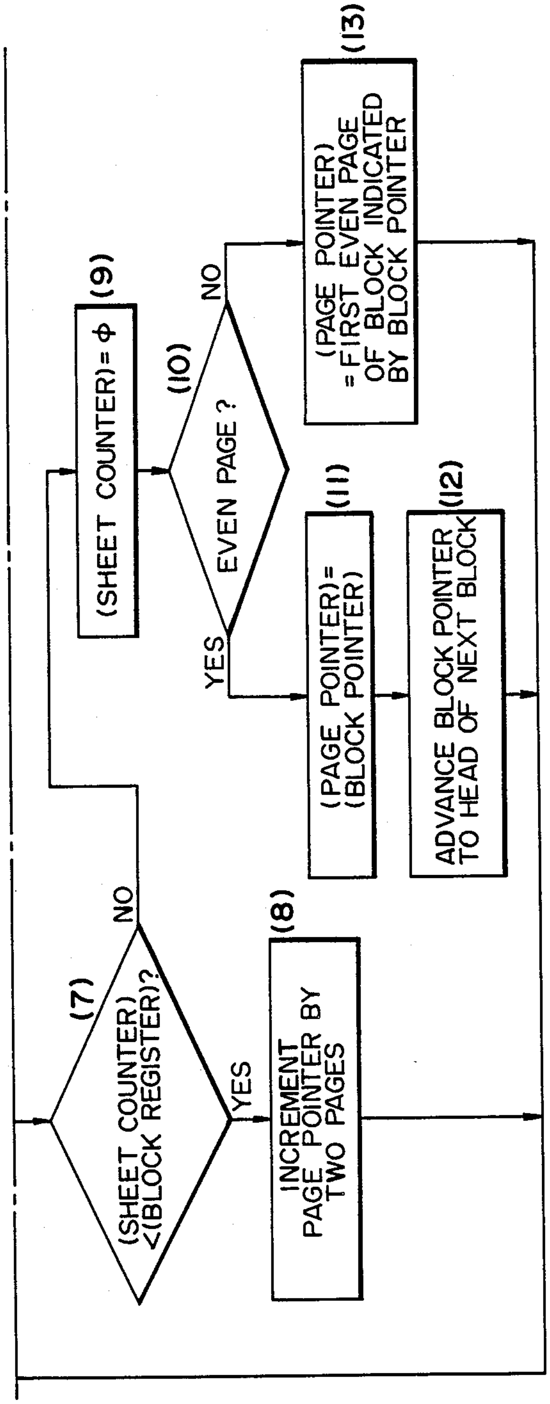
Figure 22:
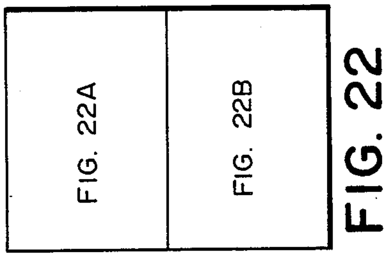
Figure 23:
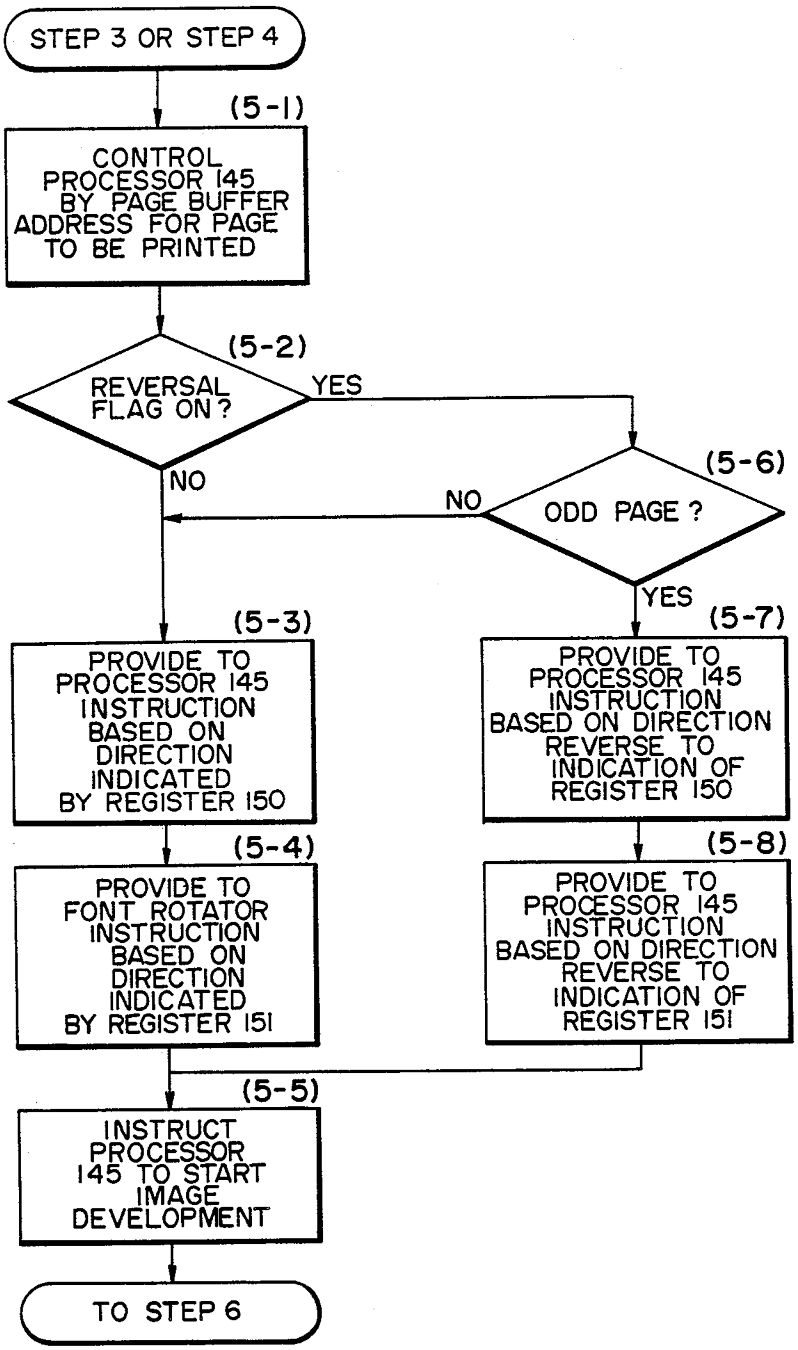

Referring to FIG. 22, the print control operation of the dual-side recording apparatus shown in FIG. 21 is explained. Flow charts shown in FIGS. 22 and 23 are programmed and stored in a ROM of the CPU 143 Numerals (1)–(13) denote steps.

The pointers, registers and counters are first initialized (1). The line direction information, character direction information and reversal flag information which are determined based on the page direction, vertical/-horizontal print and paper feed information from the paper feed unit 21 are set into the line direction register 150, character direction register 151 and reversal flag 152, respectively. The page pointer 154 and the block pointer 155 specify the page information of the page control table 153, which correspond to the second and first pages. The number of sheets in one block is determined from the record sheet size information supplied from the paper feed unit 121 and it is set into the block register 156. The sheet counter 157 is reset to zero. Whether the image data of the page designated by the page pointer 154 is present or not is checked (2), and if the image data of that page is absent, the print operation is terminated, and if the image data is present, whether the page information of the page pointer 154 is even or not is checked (3). If the page information is even, the paper feed command is issued (4) to the paper feed unit 121, and if the page information is odd, the paper feed command is not issued and the page designated by the page pointer 154 is printed (5). The content of the sheet counter 157 is incremented (6) by one, and the number of sheets in the block register 156 is compared (7) with the content of the sheet counter 157. If the content of the sheet counter 157 is smaller than the content of the block register 156, that is, if one block of image data has not yet been printed, the current page designated by the page pointer 154 is advanced (8) by two and the process returns to the step (2). During one block, only the even or odd pages are sequentially printed.

On the other hand, if the content of the sheet counter 157 reaches the content of the block register in the step (7), it means that one block of image data has been printed, and the block is updated, that is, the sheet counter 157 is reset (9) to zero. Then, whether the current page designated by the page pointer 154 is even or not is checked (10), and if it is even, the page designated by the page pointer 154 is set (11) as the head page of the current block designated by the block pointer 155. The broken line arrow directed from page 10 to page 1 shown in FIG. 21 corresponds to the step (11). Thereafter, the odd pages (pages 1, 3, 5, 7, 9) are printed. The current content ("1") of the block pointer 155 is advanced (12) by two times of the content ("5") of the sheet counter so that the feed page "11" of the next block is designated by the block pointer 155, and the process returns to the step (2). The chain line arrow directed from page 1 to page 11 shown in FIG. 21 corresponds to the step (12).

On the other hand, if the current page is odd in the step (10), the page pointer 154 designates (13) the page of the next block designated by the block pointer 155 (next page to the head odd page of the next block), that is, the first even page of the next block. Then, the process returns to the step (2). The broken line arrow directed from page 9 to page 12 shown in FIG. 21 corresponds to the step (13).

Referring to a flow chart of FIG. 23, the step (5) shown in FIG. 22 is explained in detail. Numerals (5-1)–(5-8) denote steps.

The CPU 143 examines (5-1) the page buffer address of the current page, that is, the page to be printed from the page information out of the page control table 153 designated by the page pointer 154 and controls the image processor 145 based on that address. The CPU 143 then checks (5-2) if the reversal flag 152 is ON or not, and if it is OFF, the page directions on both sides are equal and the CPU 143 instructs (5-3) to the image processor 145 based on the direction designated by the line direction register 50. Thereafter, the image processor 145 develops the image while it advances the characters in the line direction designated in the step (5-3) within one page. The CPU 143 then instructs (5-4) to the font rotator 147 based on the direction designated by the character direction register 151. Thereafter, the font rotator 147 rotates the dot patterns of the characters which the image processor 145 reads out from the CG 146 within one page, to the designated direction and sends then to the image processor 145. The CPU 143 then sends (5-5) a start of image development command to the image processor 145, which starts to develop one page of image.

On the other hand, if the reversal flag 152 is ON in the step (5-2), the CPU 143 checks (5-6) if the page information designated by the page pointer 154 is odd or not, and if the current page information is even, the process jumps to the step (5-3), and if the current page information is odd, the CPU 143 reads out the direction designated by the line direction register 150 and instructs (5-7) to the image processor 145 based on the opposite direction to the designated direction. The CPU 143 then reads out the direction designated by the character direction register 151 and instructs the opposite direction to the designated direction to the font rotator 147. The process then goes (5-8) to the step (5-5).

Thus, if the reversal flag 152 is OFF, the printing is done in the same line/character direction, that is, in the same page direction whether the page number is odd or even.

On the other hand, if the reversal flag 152 is ON, the line/character directions are opposite depending on whether the page number is odd or even so that the page directions on the front page and the rear page are different from each other.

Figure 4:
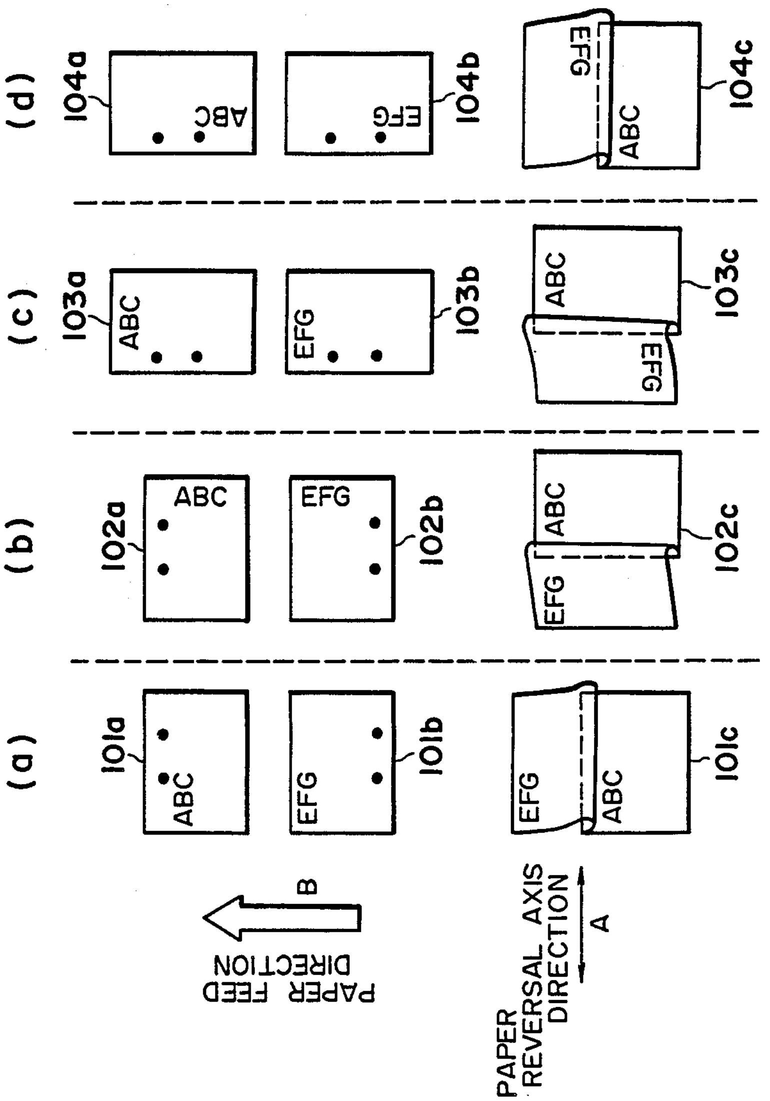
FIG. 4 PRIOR ART
FIGS. 4(*a*)–4(*d*) and 5(*a*)–5(*d*) illustrate image printouts by a prior art dual-side recording apparatus.
Figure 24:
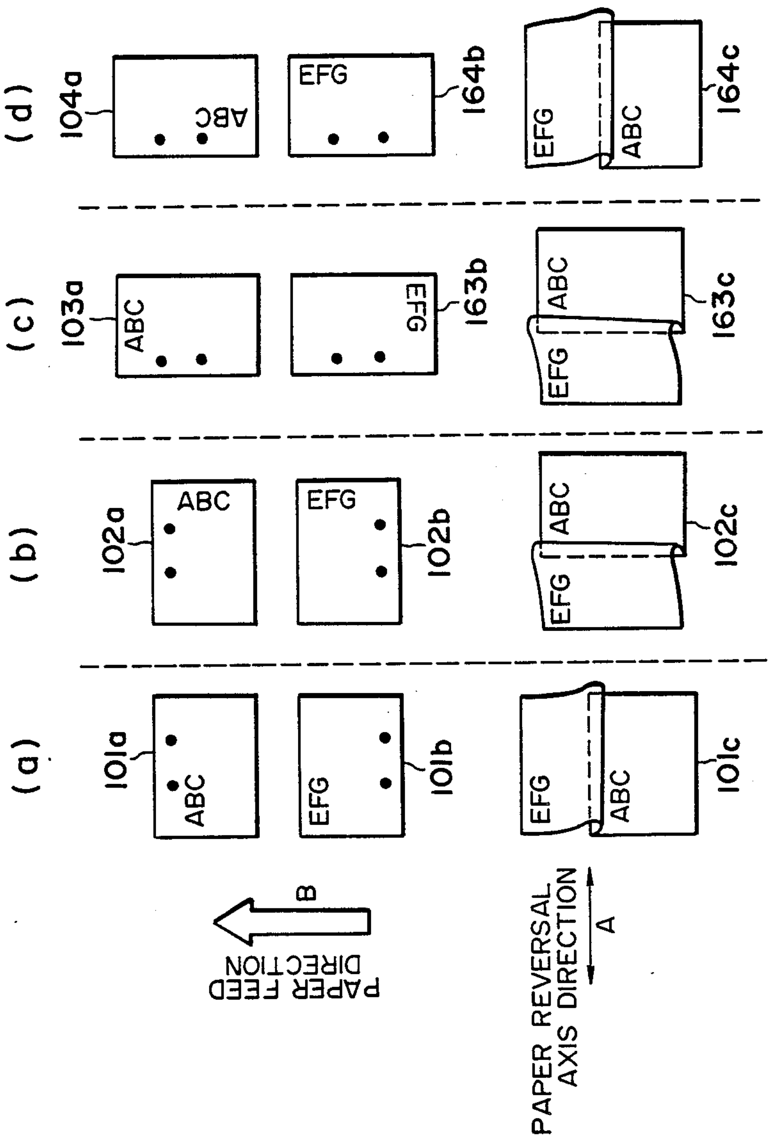

FIGS. 24(*a*)–24(*d*) illustrate image printouts by the dual-side recording apparatus. The like elements to those shown in FIG. 4 are designated by like numerals. FIGS. 24(*a*)–24(*d*) show the printouts when the reversal axis A of the record sheet is parallel or orthogonal to the seam side of the record sheet. Numeral **163*d* denotes a record sheet on which the same characters as those printed on the record sheet 103*b* are printed with the page direction being rotated. When the record sheets 103*a* and 163*d* are joined along the seam sides, a record sheet 163*c* is prepared. Numerals 164*b* denotes a record sheet on which the same characters as those printed on the record sheet 104*b* are printed with the page direction being rotated. When the record sheets 104*a* and 164*b* are joined along the seam sides, a record sheet 164*c*** is prepared.

As seen from FIG. 24, when the printing is done on the record sheets **103*a*, 104*a*, 163*b* and 164*b* in which the reversal axis A of the record sheet is orthogonal to the seam side of the record sheet, the page directions on the front side and the back side of the record sheet are reversed. As a result, when the printed record sheets 163*b* and 164*b* and the record sheets 103*a* and 104*a* are joined along the seam sides, the character directions on the record sheets 163*c* and 164*c*** are same on both sides.

Figure 5:
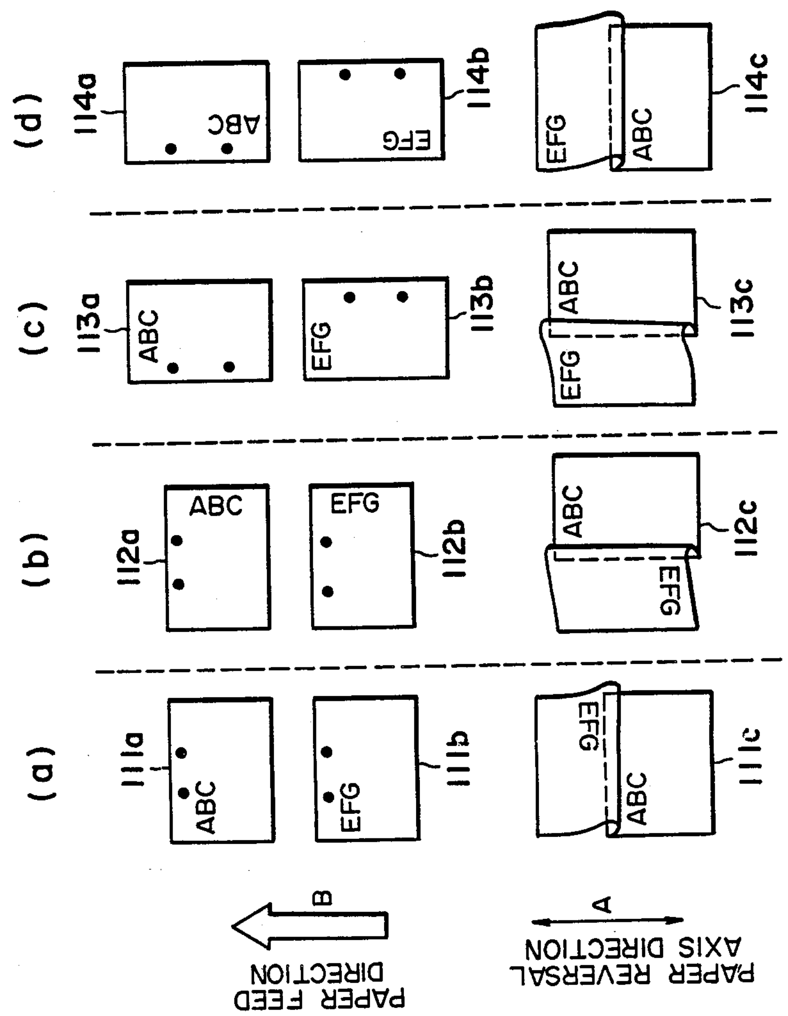
FIG. 5 PRIOR ART

The same results are obtained for the record sheets **111*a* and 112*a*, and the record sheets 111*b* and 112*b*, shown in FIG. 5**.

Figure 25:
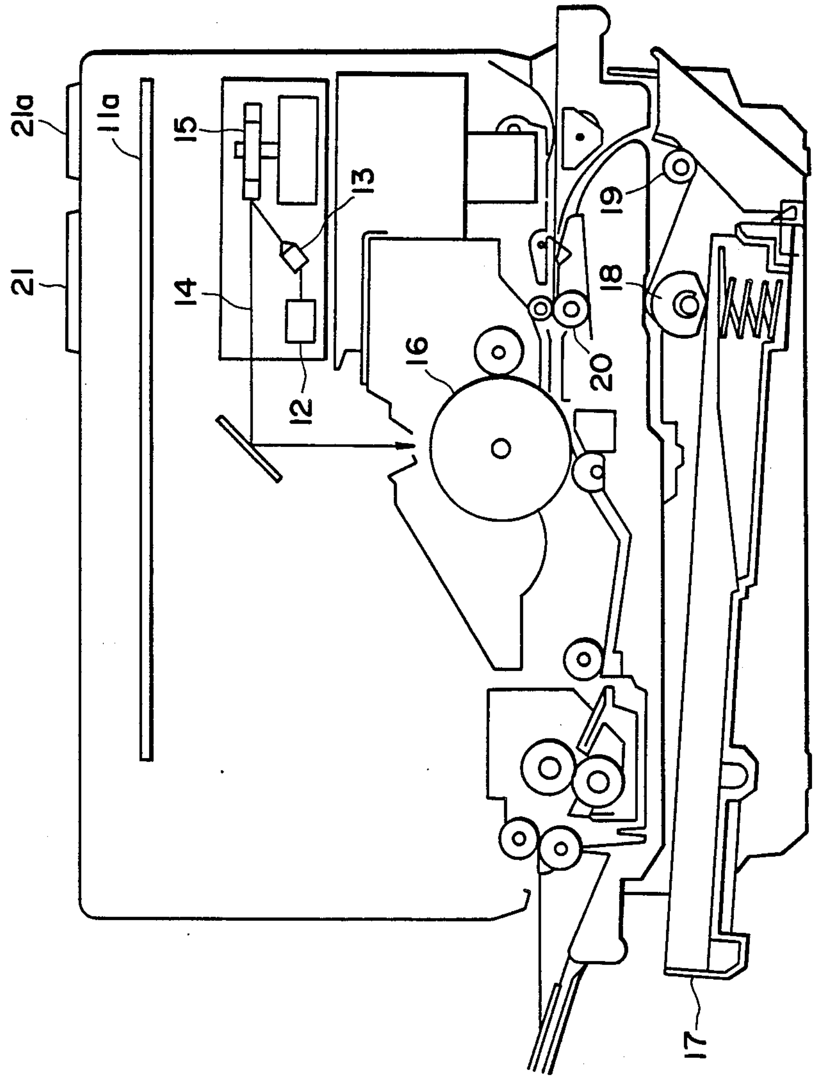
FIG. 25 is a sectional view of a fifth embodiment of the recording apparatus.

FIG. 25 shows a sectional view of a fifth embodiment of the recording apparatus of the present invention. The like elements to those shown in FIG. 6 are designated by the like numerals. Numeral **21*a* denotes point position designation means which manually designates a positional relationship between a record sheet and an image, and numeral 11*a*** denotes a control board which controls the overall printer, analyzes data and generates an image signal.

Figure 26:
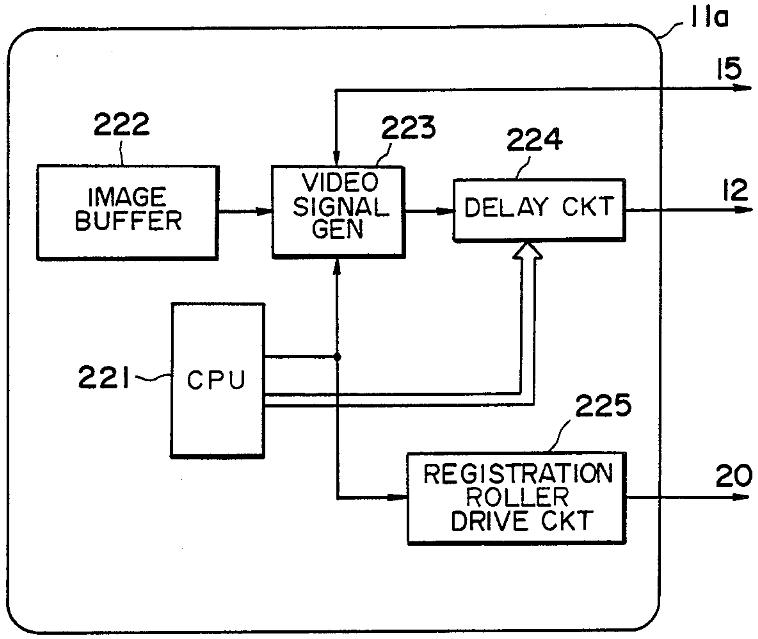
FIG. 26 is a control block diagram of a control board shown in FIG. 25.

FIG. 26 shows a control block diagram of the control board **11*a* shown in FIG. 25. Numeral 221 denotes a CPU which controls the overall system, numeral 222 denotes an image buffer which stores image information, numeral 223 denotes a video signal generator which converts the image signal stored in the image buffer 222 to a video signal, numeral 224 denotes a delay circuit which delay the video signal supplied from the video signal generator 223 by a time period designated by the CPU 221, and numeral 225 denotes a regist roller drive circuit. The video signal generator 223 generates a blank video signal during a retrace period in synchronism with retrace information from the scanner 15**.

The operation is now explained. After the preparation for one-page printing, that is, when the summer 15 and the drum 16 reach the steady rotating states and the record sheet is held by the regist roller 20, the CPU 221 determines the delay time of the video signal based on the indication from the print position designation means **21*a*, the page information and other information, and instructs the delay time to the delay circuit 224. Then, the CPU 221 sends the print start signal to the video signal generator 223 and the regist roller drive circuit 225. In response to the print start signal from the CPU 221, the video signal generator 23 converts the content of the image buffer 222 to the video signal and sends it to the delay circuit 224. The delay circuit 224 delays the input video signal by the time period designated by the CPU 221 and supplies the delayed video signal to the LD driver 12. The LD 13 is modulated by the video signal supplied to the LD driver 12 so that the ON/OFF laser beam 14 is generated, which is scanned by the scanner 15 to form a latent image on the drum 16. The latent image formed on the drum 16** is developed to a toner image by a known electrophotographic process.

On the other hand, in response to the print start signal from the CPU 221. The regist roller drive circuit 225 drives the regist roller 210 to send the record sheet which it has been holding to the drum 16 so that the toner image on the drum 16 is transferred.

The positional relationship between the record sheet and the image formed on the record sheet can be controlled by the delay time set in the delay circuit 224.

The relationship between the delay time and the displacement of the image is explained. The unit of time is normalized by one video clock, that is, a time required to print one dot which is a minimum unit of image.

The image position when the delay time Td is zero is assumed as an origin point, and the displacement of the record sheet in the feed direction is represented by V (number of scan lines), the displacement in the scan direction (normal to the feed direction of the record sheet) is represented by h (number of dots), and one scan time is represented by Ts. Thus, the delay time Td and the displacements V and h meet the following relation.

$$Td = V \cdot Ts + h \quad (1)$$

where $0 \leqq h < Ts$

Figure 27:
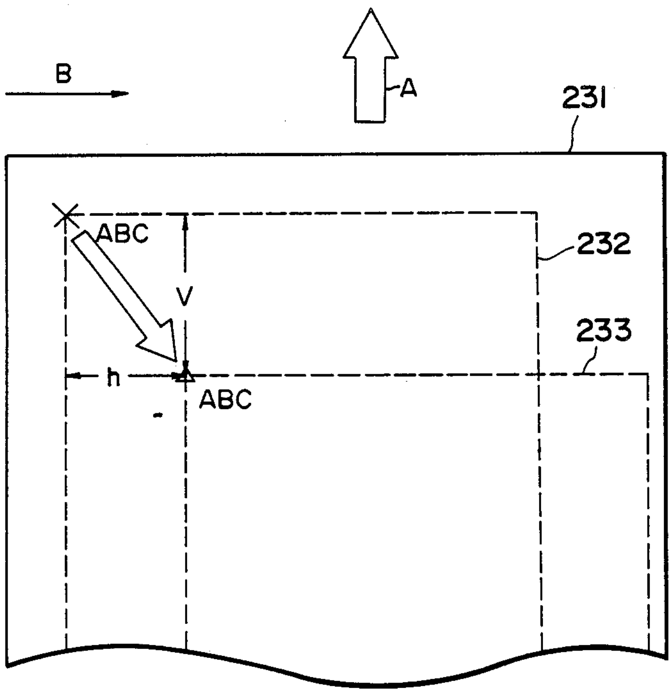
FIG. 27 illustrates an operation of a delay circuit shown in FIG. 26.

FIG. 27 illustrates the operation of the delay circuit 224 shown in FIG. 26. Numeral 231 denotes an outer edge of the record sheet, shown by a solid line rectangle, numeral 232 denotes an image (broken line) formed when the delay time Td is zero, and numeral 233 denotes an image formed when the delay time $Td = V \cdot Ts + h$, marks X and Δ indicate start position to write the images 232 and 233, respectively. An arrow A shows the feed direction of the record sheet and an arrow B shows the scan direction of the scanner 15.

As seen from FIG. 27, the start position to form the image on the record sheet is controlled by the delay time Td.

Figure 28:
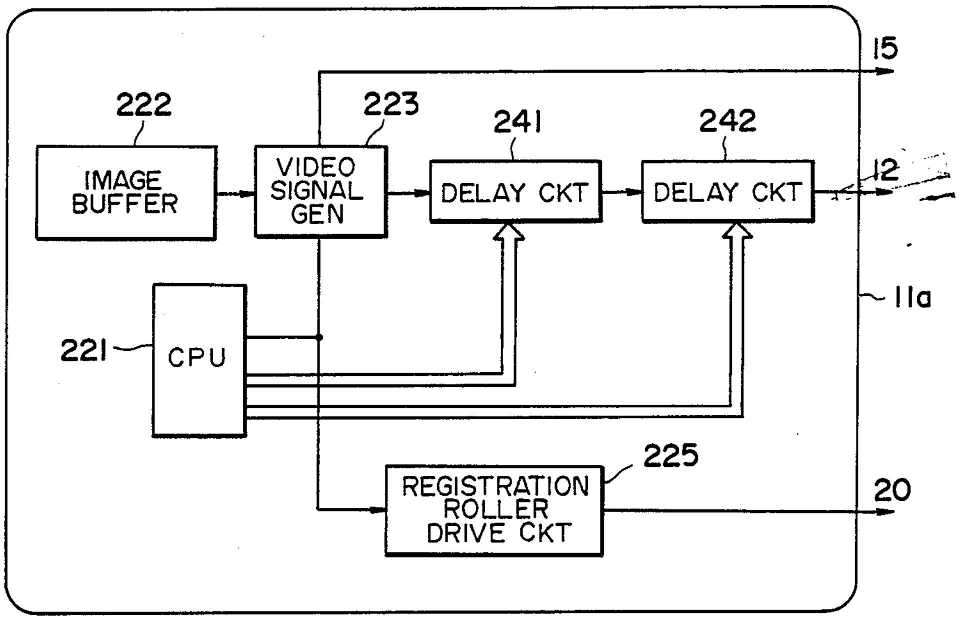
FIG. 28 is a control block diagram of other embodiment.

FIG. 28 shows another control block diagram which can be used in the recording apparatus of FIG. 25. The like blocks to those shown in FIG. 26 are designated by the like numerals. Numeral 241 denotes a delay circuit which sets the delay time Td (defined by the formula (1)) to be a multiple of one scan period of the scanner 15, and numeral 242 denotes a delay circuit which sets the delay circuit Td using the video clock as a unit. The total delay time Td is a sum of the delay times Td of the delay circuits 241 and 242. The maximum delay time of the delay circuit 242 is equal to one scan period of the scanner 15.

By arranging two delay circuits 241 and 242, the CPU 221 of FIG. 28 sets separate delay times to the delay circuits 241 and 242 if the delay time of the delay circuit 242 does not exceed one scan period of the scanner 15, Thus, the CPU 221 can control the displacement of the image independently in the feed direction of the record sheet and the scan direction of the scanner 15, and a burden of control by the CPU 221 is reduced. The dynamic ranges (ratios of the maximum delay times to the minimum delay times) required for the delay circuits 241 and 242 can be reduced compared to the dynamic range required for the delay circuit 224 shown in FIG. 26. For a given maximum displacement of the image, the dynamic range of the delay circuit 224 shown in FIG. 26 is equal to a product of the dynamic ranges of the delay circuits 241 and 242.

Figure 29:
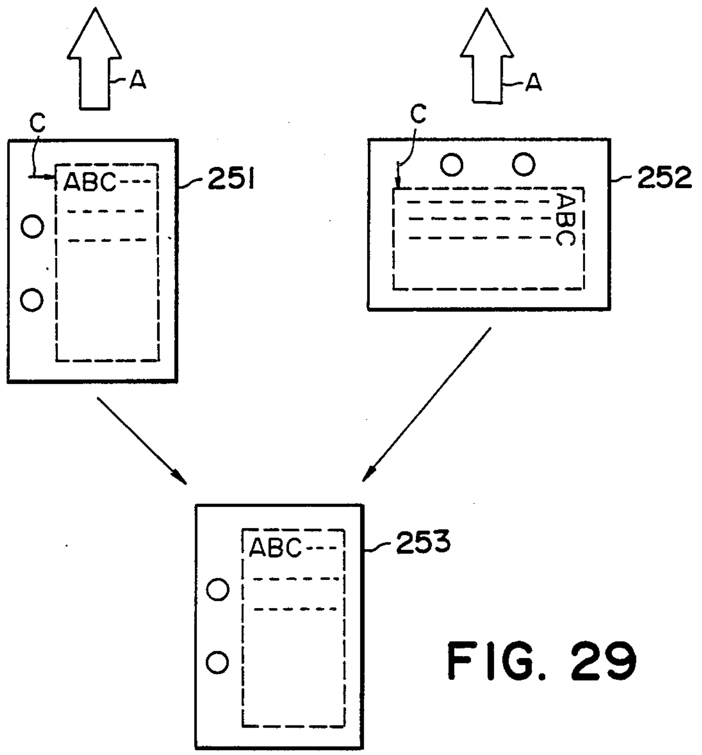
FIG. 29 illustrates image formation on a record sheet.

FIG. 29 illustrates the formation of the image on the record sheet. Numerals 251 and 252 denote record sheets. The record sheet 251 is longitudinally fed relative to the feed direction A. The record sheet 252 is laterally fed relative to the feed direction A. Numeral 253 denotes a record sheet having an image thereof formed on the record sheets 251 and 252. An arrow C shows an image shift direction and circles 0 in the record sheets 251–253 show finding holes.

As seen from FIG. 29, by properly setting the delay times of the delay circuits 241 and 242, the images formed when the record sheets 251 and 252 having the finding holes are fed in the feed direction A are equal to that of the record sheet 253. In the record sheet 251, the start position to form the image is shifted in the scan direction so that the image does not overlap the finding holes. In the record sheet 252, the start position to form the image is shifted in the opposite direction to the feed direction so that the image does not overlap the finding holes.

Figure 30:
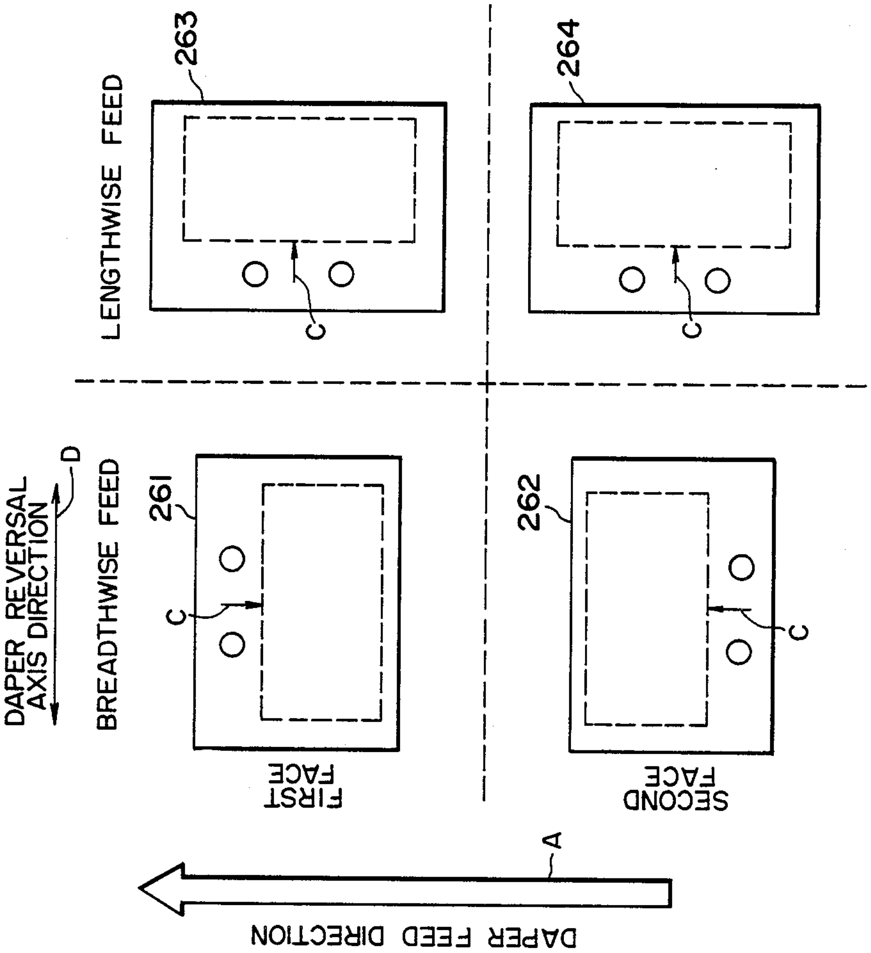
FIGS. 30 and 32 illustrate an image print operation.
Figure 31:
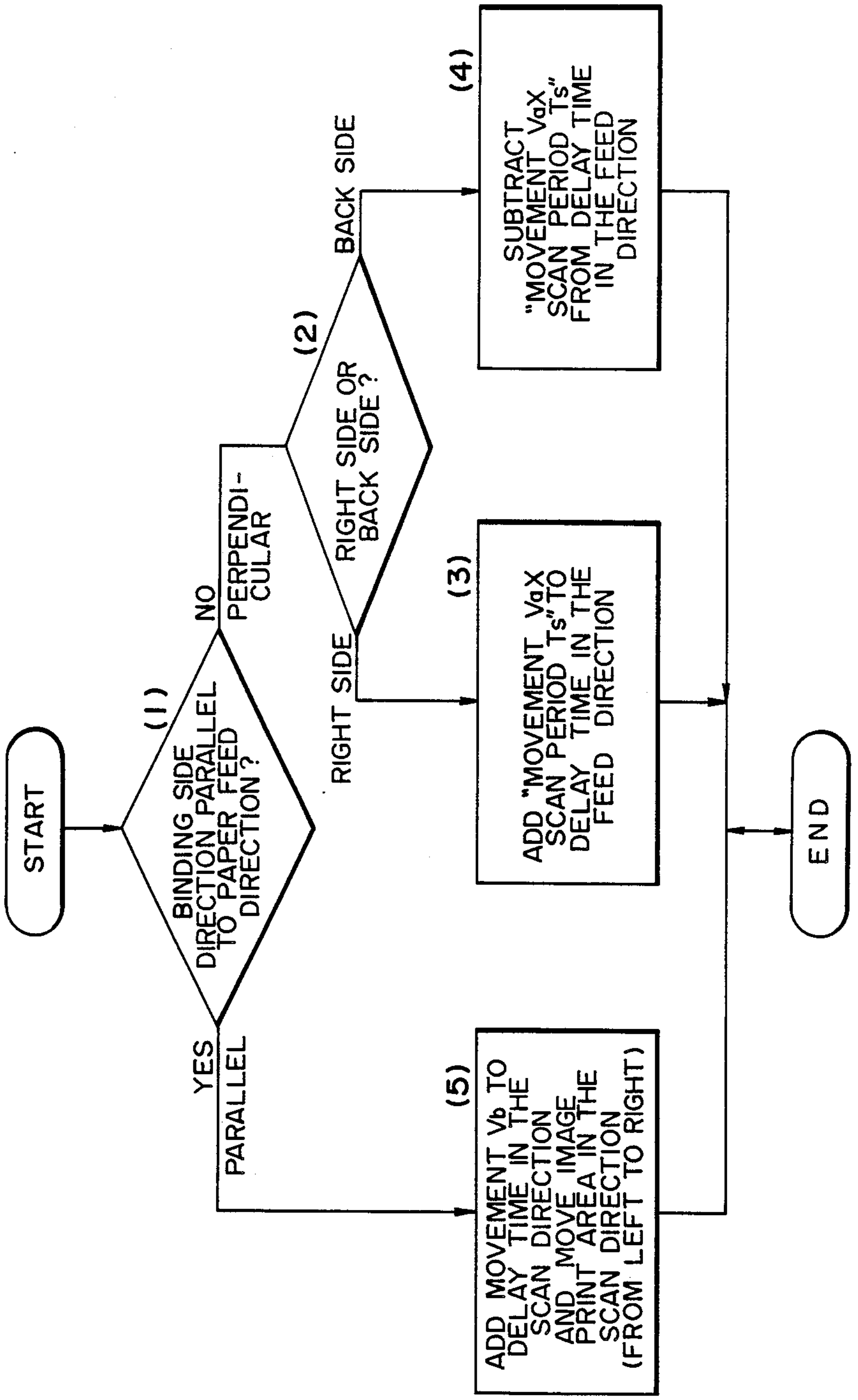
FIGS. 31 and 33 are flow charts for explaining control operations in FIGS. 30 and 32.

Referring to FIGS. 30 and 31, the present embodiment is applied to a dual-side printer having a record sheet reversal mechanism and a reversal axis of a record sheet which is orthogonal to the feed direction of the record sheet.

In FIG. 30, numerals 261 and 263 denote record sheets having seam sides. The record sheet 261 is laterally fed and the record sheet 263 is longitudinally fed. Numerals 262 and 264 denote record sheets which are the record sheets 261 and 263 reversed by a record sheet reversal mechanism (not shown) and refed. The record sheet 261 corresponds to a first side and the record sheet 262 corresponds to a second sheet. The record sheets 263 and 264 have a similar relationship The arrow A shows the feed direction of the record sheet, the arrow C shows the image shift direction, the arrow D shows the reversal axis of the record sheet, and the broken line rectangle shows a print area.

As seen from FIG. 30, when the laterally fed record sheet 261 is fed and the image has been formed thereon, the record sheet reversal mechanism reverses the record sheet 261. Since the reversal axis D of the record sheet is parallel to the seam side of the record sheet, the record sheet 261 fed back to a record sheet feed port (not shown) now becomes the record sheet 262, and the seam side position on the record sheet 261 does not match the seam side position on the record sheet 262. If the image is formed on the record sheet 262 in the same manner is that for the record sheet 261, the image is formed on the seam side area. In order to prevent it, the delay times of the delay circuit 224 or 241 are different for the record sheets 261 and 262 so that the image is not formed on the seam side area.

When the longitudinally fed record sheet 263 is fed and the image has been formed thereon, the record sheet reversal mechanism reverses the record sheet 263. Since the reversal axis D of the record sheet is orthogonal to the seam side of the record sheet, the record sheet 263 fed back to the record sheet feed port now becomes the record sheet 264, and the seam side position on the record sheet 263 matches with that of the record sheet 264. Accordingly, when the image is to be formed on the record sheet 264, the delay time set for the record sheet 263 may be set in the delay circuit 224 or 242.

Figure 33:
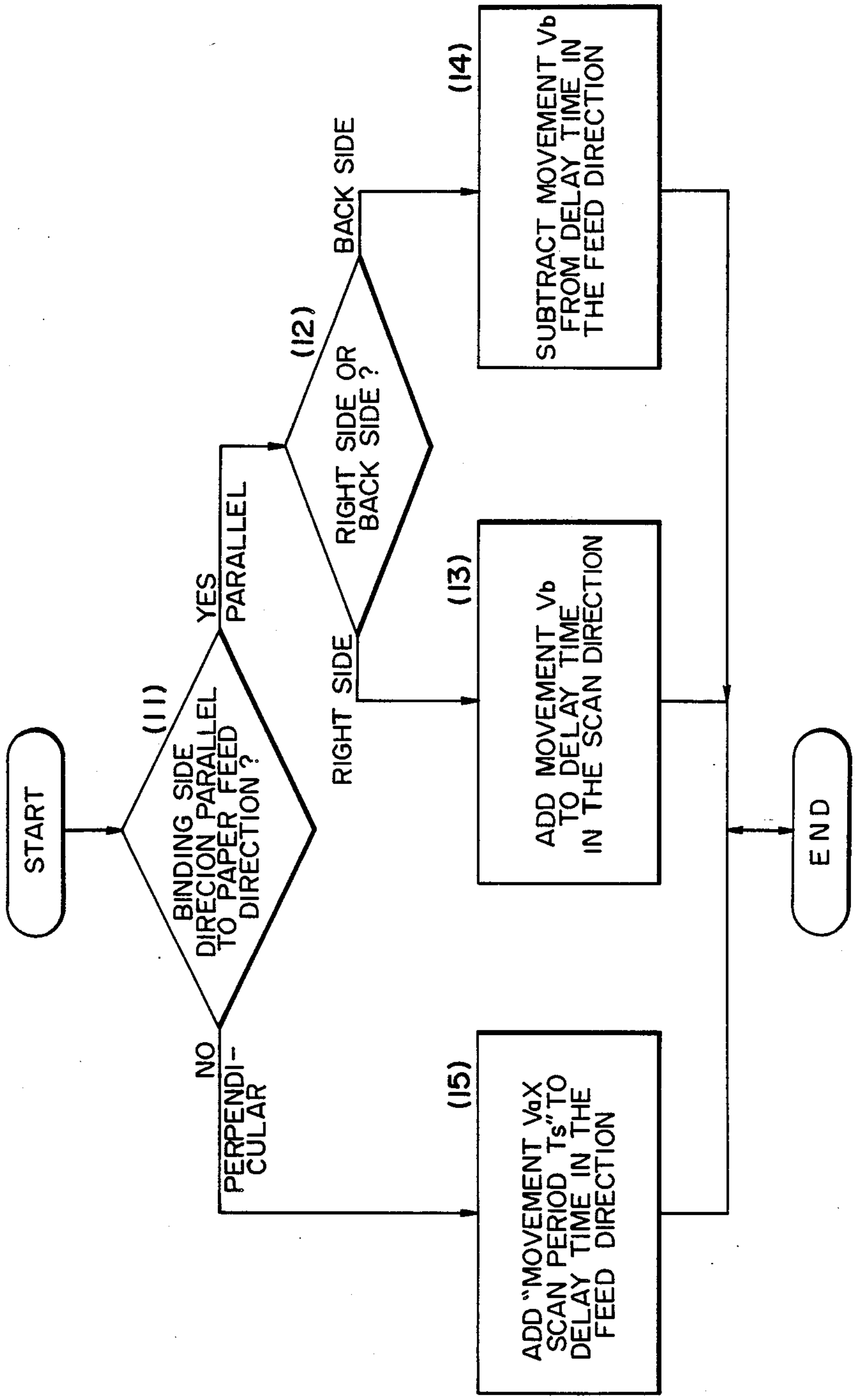

Referring to a flow chart shown in FIG. 31, the operation of FIG. 30 is explained. Flow charts shown in FIGS. 31 and 33 are programmed and stored in a ROM of the CPU 221. Numerals (1)–(5) denote steps. The reversal axis D of the record sheet is orthogonal to the feed direction A of the record sheet.

First, whether the seam side of the record sheet is parallel to the feed direction of the record sheet or not is checked (1). The seam side of the record sheet usually runs along a longitudinal side of the record sheet. When the record sheets 261 and 262 are fed, the decision in the step (1) is NO. In a step (2), whether the record sheet is front side or back side is checked. If it is front side (record sheet 261 in FIG. 30), "displacement Va x scan time Ts" is added (3) to the feed direction delay time set in the delay circuit 41 so that image print area is moved below the seam side area as shown in the record sheet 261. On the other hand, if the record sheet is back side in the decision of the step (2) (record sheet 262 shown in FIG. 30), "displacement Va x scan period Ts" is subtracted (4) from the feed direction delay time set in the delay circuit 241 so that the image print area is shifted above the seam side area as shown in the record sheet 262.

On the other hand, if the decision in the step (1) is YES, the displacement Vb is added to the scan direction delay time set in the delay circuit 242 to shift (5) the image print area in the scan direction (left or right) as shown in the record sheets 263 and 264.

Figure 32:
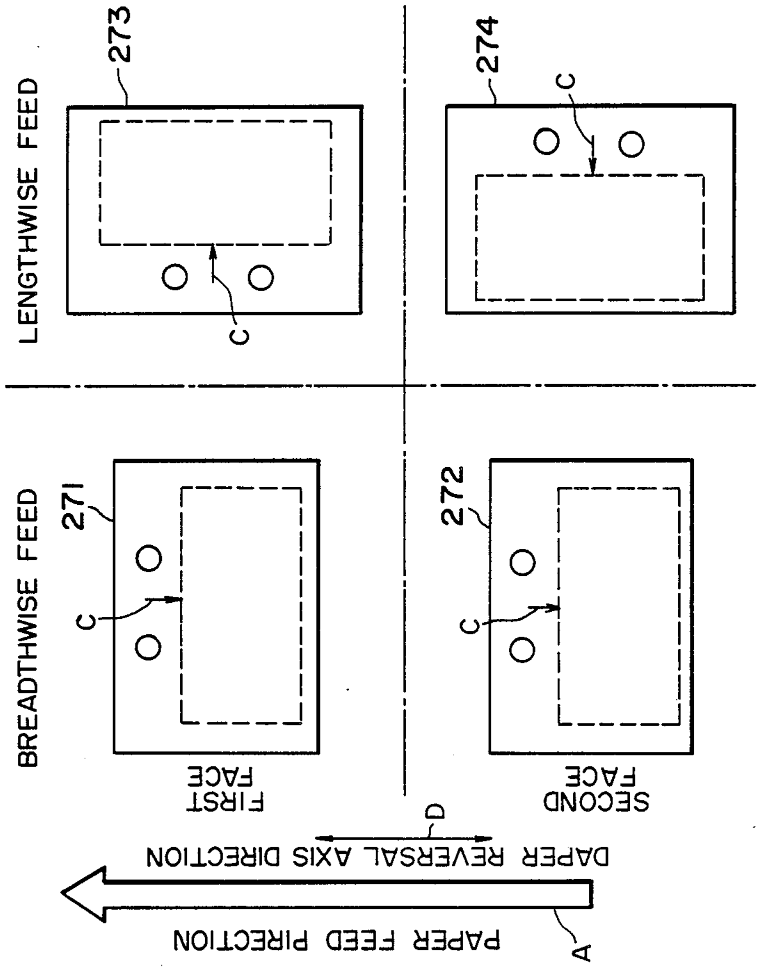

Referring to FIGS. 32 and 33, the present invention is applied to the dual-side printer having the record sheet reversal mechanism and the reversal axis D of the record sheet parallel to the feed direction A of the record sheet.

In FIG. 32, numerals 271 and 273 denote record sheets having seam sides. The record sheet 271 is laterally fed and the record sheet 273 is longitudinally fed. Numerals 272 and 274 denote record sheets which are the record sheets 271 and 273 reversed by a record sheet reversal mechanism (not shown) and fed back. The record sheet 271 corresponds to a first side and the record sheet 272 corresponds to a second side. The record sheets 273 and 274 have a similar relation. An arrow A shows the feed direction of the record sheet, an arrow C shows an image shift direction, an arrow D shows the reversal axis of the record sheet and a broken line rectangle shows a print area.

As seen from FIG. 32, when the record sheet 273 was longitudinally fed and the image has been formed thereon, the record sheet reversal mechanism reverses the record sheet 273. Since the reversal axis D of the record sheet is parallel to the seam side of the record sheet, the record sheet 273 fed back to a record sheet feed port (not shown) now becomes the record sheet 274 and the seam side position on the record sheet 273 does not match that of the record sheet 274. If the image is formed on the record sheet 274 in the same manner as that for the record sheet 273, the image is formed on the seam side area. In order to prevent it, different delay times are set in the delay circuit 224 or 242 for the record sheets 273 and 274 so that the image is not formed on the seam side area.

When the record sheet 271 was laterally formed and the image has been formed thereon, the record sheet reversal mechanism reverses the record sheet 271. Since the reversal axis D of the record sheet is orthogonal to the seam side of the record sheet, the record sheet 271 fed back to the record sheet feed port now becomes the record sheet 272 and the seam side position on the record sheet 271 matches the seam side position of the second sheet 272. Accordingly when the image is to be formed on the record sheet 272, the delay time set for the record sheet 271 may be set in the delay circuit 224 or 241.

Referring to a flow chart shown IN FIG. 33, the operation of FIG. 32 is explained. Numerals (11)-(15) denote steps. The reversal axis D of the record sheet is parallel to the feed direction A of the record sheet.

First, whether the seam side of the record sheet is parallel to the feed direction A of the record sheet or not is checked (11). The seam side of the record sheet usually runs along a longitudinal side of the record sheet. When the record sheets 273 and 274 are fed, the decision in the step (11) is YES, and in a step (12), the record sheet is checked whether it is front side or back side. If it is front side (record sheet 273 shown in FIG. 32), the displacement Vb is added (13) to the scan direction delay time set in the delay circuit 224 or 242 so that the image print area is shifted rightward of the seam side area as shown in the record sheet 273. On the other hand., if the record sheet is back side in the step (12) (record sheet 274 shown in FIG. 32), the displacement Vb is subtracted (14) from the scan direction delay time set in the delay circuit 224 or 242 so that the image print area is shifted leftward of the seam side area as shown in the record sheet 274.

On the other hand, if the decision in the step (11) is NO, "displacement Va x scan time Ts" is added (15) to the feed direction delay time set in the delay circuit 241 so that the image print area is shifted below the seam side area as shown in the record sheets 271 and 272.

In the above embodiments, the finding holes or the seam side extend along the longitudinal side of the record sheet although they need not extend along the longitudinal side. The finding hole side or seam side may be designated by external input means such as the print position designation means 21*a* and the control information in the input data, or it may be determined by form information for each form type. Since the rectangular forms are usually found along the longitudinal sides, the longitudinal side may be designated as the seam side based on the paper feed information.

The present invention is applicable to not only the record sheets but also any record media.

The present invention is not restricted to the illustrated embodiments but various modifications may be made within a scope of the claim.

We claim:

1. An image recording apparatus comprising:
print data input means for inputting print data;
image forming means for forming an image on a record medium in accordance with the inputted print data; and
control means for determining a processing code of the inputted print data on the basis of inputted page direction information representing a page direction of an image to be formed and inputted print direction information representing a print direction of the image to be formed.

2. Am image recording apparatus according to claim 1 further comprising means for feeding said record medium, wherein said control means determines a line direction and a character direction on the basis of a feed direction of the record medium, the page direction information and the print direction.

3. An image recording apparatus according to claim 2, wherein said control means includes first memory means for storing line direction data representing the line direction, second memory means for storing character direction data representing the character direction, and determines a processing mode of the print data on the basis of the line direction data and the character direction data.

4. An image recording apparatus according to claim 3, wherein said control means includes buffer means for storing the inputted print data and determines an arrangement order of the print data in said buffer means on the basis of the line direction data.

5. An image recording apparatus according to claim 4, wherein said control means includes dot pattern generation means for generating a dot pattern on the basis of the print data and rotation means for rotating the dot pattern on the basis of the character direction data.

6. An image recording apparatus according to claim 5, wherein said print data comprises a character code.

7. An image recording apparatus according to claim 2, wherein said control means includes a table used to determine the line direction and the character direction, referring to the feed direction information, the page direction information and the print direction information.

8. An apparatus according to claim 2, further comprising means for accommodating a record medium, wherein said control means recognizes a feed direction of the record medium by detecting a type of said accommodating means, and said control means receives the page direction information and the print direction, as control commands, from an external apparatus.

9. An apparatus according to claim 1, wherein said control means includes conversion means for converting the input print data into dot image data, and buffer means capable of storing dot image data corresponding to input print data of at least one page, and wherein said control means changes a state of development of the dot image data record in said buffer means on the basis of the page direction information and the print direction information.

10. An apparatus according to claim 1, wherein said control means has a table employed to determine a processing mode of the input print data in reference to the page direction information and the print direction information.

11. A dual-side image recording apparatus comprising:

a record medium;

image forming means for forming images on first and second sides of said record medium, wherein said image forming means has first and second dual-side image formation modes for forming images on both sides of said record medium, said modes being different from each other in a manner of forming an image on said record medium; and control means for controlling said image forming means, wherein said control means includes memory means for storing data representative of a direction of a seam side of said record medium, and performs a control operation thereof so that the first and second dual-side image formation modes of said image forming means is changeable in accordance with said data representing said direction.

12. A dual-side image recording apparatus according to claim 11, wherein said image forming means has the first dual-side image formation mode in which the directions of images reproduced on the first side and the second side of said record medium, respectively, are different, and the second dual-side image formation mode in which the direction of images reproduced on the first side and the second side of said record medium, respectively, are the same, and said control means selects said first or said second dual-side image formation mode in accordance with said data stored in said memory means.

13. A dual-side image recording apparatus according to claim 12, wherein said control means includes image data input means for inputting image data and buffer means for storing the image data inputted, and wherein said control means determines a processing mode of the image data on the basis of said data, and sends to said image forming means the image data processed in accordance with the determined processing mode.

14. A dual-side image recording apparatus according to claim 13, wherein said control means includes dot pattern generation means for generating a dot pattern on the basis of said image data and second buffer means for storing the dot pattern generated, and determines a rotation direction of the dot pattern and an arrangement order of the dot pattern in said second buffer means on the basis of said data.

15. A dual-side image recording apparatus comprising:

a record medium;

image forming means for forming images on first and second sides of said record medium, wherein said image forming means has a first dual-side image formation mode in which positions of images reproduced on the first side and the second side of the record medium, respectively, are different, and a second dual-side image formation node in which the positions of images reproduced on the first side and the second side of the record medium, respectively, are the same; and control means for controlling said image forming means, wherein said control means selects one of the first and second dual-side image formation modes in accordance with a direction of a seam side of the record medium.

16. A dual-side image recording apparatus according to claim 15, wherein said control means includes buffer means for storing image data and delay means for delaying the image data outputted from said buffer means, and controls said delay means in accordance with a selected mode, and wherein the image data output from said delay means is sent to said image forming means for image formation.

17. A dual-side image recording apparatus according to claim 15, wherein said control means selects one of the first and second dual-side image formation modes in accordance with the relation between a reversal direction of the record medium and a direction of a seam side of the record medium.

18. A dual-side image recording apparatus comprising:

image data input means; and image forming means for forming images on first and second sides of a record medium in accordance with the input image data;

wherein said image forming means includes means for determining a timing for processing said image data, and said timing determining means has a first mode in which processing timings of the image data are different for the first side and the second side of said record medium; and a second mode in which the processing timings are the same for the first side and the second side of said record medium, and selects one of the first and second modes in accordance with a direction of a seam side of said record medium.

19. A dual-side image recording apparatus according to claim 18, wherein said image forming means includes buffer means for storing the image data and delay means for delaying the image data outputted from said buffer means, and said timing determining means controls said delay means in accordance with a selected mode.

20. A dual-side image recording apparatus according to claim 18, wherein said timing determining means selects one of the first and second modes in accordance with the relation between a reversal direction of the record medium and a direction of a seam side of the record medium.

21. An image recording apparatus comprising:
print data input means for inputting print data;
image forming means for forming an image on a record medium in accordance with the inputted print data;
means for feeding said record medium; and
control means for determining a processing mode of the inputted print data on the basis of inputted page direction information representing a page direction of an image to be formed and a feed direction of the record medium.

22. An image record apparatus according to claim 21, wherein said control means further inputs print direction information representing a print direction of the image to be formed, and determines a line direction and a character direction on the basis of the feed direction, the page direction information and the print direction information.

23. An image recording according to claim 22, wherein said control means includes first memory means for storing line direction data representing the line direction, second memory means for storing character direction data representing the character direction, and determines a processing mode of the print data on the basis of the line direction data and the character direction data.

24. An image recording apparatus according to claim 23, wherein said control means includes buffer means for storing the inputted print data and determines an arrangement order of the print data in said buffer means on the basis of the line direction data.

25. An image recording apparatus according to claim 24, wherein said control means includes dot pattern generation means for generating a dot pattern on the basis of the print data and rotation means for rotating the dot pattern on the basis of the character direction data.

26. An image recording apparatus according to claim 25, wherein said print data comprises a character code.

27. An image recording apparatus according to claim 26, wherein said control means includes a table used to determine the line direction and the character direction, referring to the feed direction information, the page direction information and the print direction information.

28. An apparatus according to claim 21, further comprising means for accommodating a record medium, wherein said control means recognizes a feed direction of the record medium by detecting a type of said accommodating means, and said control means receives the page direction information, as control commands, from an external apparatus.

29. An apparatus according to claim 21, wherein said control means includes conversion means for converting the input print data into dot image data, and buffer means capable of storing dot image data corresponding to print data of at least one page, and wherein said control means changes a state of development of the dot image data stored in said buffer means on the basis of the page direction information and the feed direction of said record medium.

30. An apparatus according to claim 21, wherein said control means has a table employed to determine a processing mode of the input print data in reference to the page direction information and the feed direction of the record medium.

31. An image recording apparatus comprising:
print data input means for inputting print data;
image forming means for forming an image on a record medium in accordance with the inputted print data;
means for feeding said record medium; and
control means for determining a line direction on the basis of a feed direction of the record medium, wherein said control means determines a processing mode of the inputted print data on the basis of the determined line direction.

32. An image recording apparatus according to claim 31, wherein said control means further inputs page direction information representing a page direction of an image to be formed, and print direction information representing a print direction of the image to be formed, and determines the line direction and a character direction on the basis of the feed direction, the print direction information, and the page direction information.

33. An image recording apparatus according to claim 32, wherein said control means includes first memory means for storing line direction data representing the line direction, second memory means for storing character direction data representing the character direction, and determines a processing mode of the print data on the basis of the line direction data and the character direction data.

34. An image recording apparatus according to claim 33, wherein said control means includes buffer means for storing the inputted print data and determines an arrangement order of the print data in said buffer means on the basis of the line direction data.

35. An image recording apparatus according to claim 34, wherein said control means includes dot pattern generation means for generating a dot pattern on the basis of the print data and rotation means for rotating the dot pattern on the basis of the character direction data.

36. An image recording apparatus according to claim 32, wherein said control means includes a table used to determine the line direction and the character direction, referring to the feed direction information, the page direction information and the print direction information.

37. An apparatus according to claim 31, further comprising means for accommodating a record medium, wherein said control means recognizes a feed direction of the record medium by detecting a type of said accommodating means.

38. An apparatus according to claim 31, wherein said control means includes conversion means for converting the input print data into dot image data, and buffer means capable of storing dot image data corresponding to input print data of at least one page, and wherein said control means changes a state of development of the dot image data stored in said buffer means on the basis of the determined line direction.

39. An apparatus according to claim 31, wherein said control means has a table employed to determine a line direction in reference to the feed direction of the record medium.

* * * * *

UNITED STATES PATENT AND TRADEMARK OFFICE
CERTIFICATE OF CORRECTION

PATENT NO. : 4,876,562

DATED : October 24, 1989

INVENTOR(S) : YASUHITO SUZUKI ET AL. Page 1 of 6

It is certified that error appears in the above-identified patent and that said Letters Patent is hereby corrected as shown below:

SHEET 8 OF 29

FIG. 10, "DRINT DIRECTION" should read --PRINT DIRECTION--.

SHEET 12 OF 29

FIG. 15, "DRINT DIRECTION" should read --PRINT DIRECTION--.

SHEET 13 OF 29

FIG. 16, "DRINT DIRECTION" should read --PRINT DIRECTION--.

SHEET 14 OF 29

FIG. 17, "OVRRALL" should read --OVERALL-- and "CONTENSE" should read --CONTENTS--.

SHEET 15 OF 29

FIG. 18, "PAGE BUFFUR 33" should read --PAGE BUFFER 33--.

SHEET 26 OF 29

FIG. 30, "DAPER REVERSAL" should read --PAPER REVERSAL-- and "DAPER FEED" should read --PAPER FEED--.

SHEET 28 OF 29

FIG. 32, "DAPER REVERSAL" should read --PAPER REVERSAL--.

UNITED STATES PATENT AND TRADEMARK OFFICE
CERTIFICATE OF CORRECTION

PATENT NO. : 4,876,562

DATED : October 24, 1989

INVENTOR(S) : YASUHITO SUZUKI ET AL.

It is certified that error appears in the above-identified patent and that said Letters Patent is hereby corrected as shown below:

SHEET 29 OF 29

FIG. 33, "DIRECION PARALLEL" should read --DIRECTION PARALLEL--.

COLUMN 1

Line 5, "field" should read --filed--.
Line 39, "following" should read --the following--.
Line 49, "L" should be deleted.
Line 51, "operates" should read --operate--.

COLUMN 3

Line 57, "apparatus" should read --apparatus.--.

COLUMN 4

Line 22, "Arabian" should read --Arabic--.
Line 44, "FIG. 27" should read --¶ FIG. 27--.
Line 46, "other" should read --another--.

COLUMN 5

Line 38, "image buffer 7" should read --image buffer 37--.
Line 46, "(or character direction register" should read --(or character direction register)--.
Line 58, "indicates" should read --indicate--.

UNITED STATES PATENT AND TRADEMARK OFFICE

CERTIFICATE OF CORRECTION

PATENT NO. : 4,876,562
DATED : October 24, 1989
INVENTOR(S) : YASUHITO SUZUKI ET AL.

It is certified that error appears in the above-identified patent and that said Letters Patent is hereby corrected as shown below:

COLUMN 6

Line 15, "shown" should read --show--.
Line 38, "FIG. 7" should read --FIG. 7.--.

COLUMN 7

Line 25, "i" should read --is--.
Line 32, "refers" should read --refers to--.

COLUMN 8

Line 62, "refers" should read --refers to--.
Line 65, "refers" should read --refers to--.

COLUMN 9

Line 2, "CPO 31" should read --CPU 31--.
Line 3, "refers" should read --refers to--.
Line 32, "refers" should read --refers to--.
Line 33, "L" should be deleted.

COLUMN 10

Line 60, "reversal mechanism 30" should read --reversal mechanism 130--.
Line 63, "drum 23" should read --drum 123--.
Line 66, "pre-fixing feed path 25" should read --pre-fixing feed path 125--.

UNITED STATES PATENT AND TRADEMARK OFFICE

CERTIFICATE OF CORRECTION

PATENT NO. : 4,876,562

DATED : October 24, 1989

INVENTOR(S) : YASUHITO SUZUKI ET AL. Page 4 of 6

It is certified that error appears in the above-identified patent and that said Letters Patent is hereby corrected as shown below:

COLUMN 11

Line 14, "control" should read --controls--.

COLUMN 14

Line 7, "L" should be deleted.

COLUMN 15

Line 29, "line direction register 50." should read --line direction register 150.--.

COLUMN 16

Line 41, "delay" should read --delays--.
Line 48, "summer 15" should read --scanner 15--.
Line 58, "video signal generator 23" should read --video signal generator 223 --.

COLUMN 17

Line 2, "CPU 221. The" should read --CPU 221, the--.
Line 20, "tion." should read --tion:--.
Line 54, "ner 15," should read --ner 15.--.

COLUMN 18

Line 5, "circles 0" should read --circles ○--.
Line 47, "is" (first occurrence) should read --as--.

UNITED STATES PATENT AND TRADEMARK OFFICE

CERTIFICATE OF CORRECTION

PATENT NO. : 4,876,562

DATED : October 24, 1989

INVENTOR(S) : YASUHITO SUZUKI ET AL.

It is certified that error appears in the above-identified patent and that said Letters Patent is hereby corrected as shown below:

COLUMN 20

Line 1, "IN" should read --in--.
Line 44, "a scope" should read --the scope-- and "claim." should read --claims.--.
Line 57, "Am" should read --An--.
Line 62, "print direction." should read --print direction information.--

COLUMN 21

Line 26, "print direction," should read --print direction information--.
Line 58, "is" should read --are--.

COLUMN 22

Line 29, "node" should read --mode--.

UNITED STATES PATENT AND TRADEMARK OFFICE

CERTIFICATE OF CORRECTION

PATENT NO. : 4,876,562

DATED : October 24, 1989

INVENTOR(S) : YASUHITO SUZUKI ET AL.

It is certified that error appears in the above-identified patent and that said Letters Patent is hereby corrected as shown below:

COLUMN 23

Line 23, "image record apparatus" should read --image recording apparatus--.

Line 30, "image recording" should read --image recording apparatus--.

Signed and Sealed this

Twenty-ninth Day of December, 1992

Attest:

DOUGLAS B. COMER

*Attesting Officer* *Acting Commissioner of Patents and Trademarks*